US012061821B1

(12) United States Patent
Shveidel et al.

(10) Patent No.: US 12,061,821 B1
(45) Date of Patent: Aug. 13, 2024

(54) VARIABLE SIZE METADATA PAGES WITH LOG-STRUCTURED METADATA

(71) Applicant: Dell Products L.P., Hopkinton, MA (US)

(72) Inventors: Vladimir Shveidel, Pardes-Hana (IL); Amitai Alkalay, Kadima (IL); Lior Kamran, Rishon LeZion (IL)

(73) Assignee: Dell Products L.P., Hopkinton, MA (US)

( * ) Notice: Subject to any disclaimer, the term of this patent is extended or adjusted under 35 U.S.C. 154(b) by 22 days.

(21) Appl. No.: 18/101,826

(22) Filed: Jan. 26, 2023

(51) Int. Cl.
G06F 12/00 (2006.01)
G06F 3/06 (2006.01)
G06F 12/02 (2006.01)
G06F 12/1045 (2016.01)

(52) U.S. Cl.
CPC .......... *G06F 3/0667* (2013.01); *G06F 3/061* (2013.01); *G06F 3/0683* (2013.01); *G06F 12/0246* (2013.01); *G06F 12/1045* (2013.01); *G06F 2212/1016* (2013.01)

(58) Field of Classification Search
CPC .... G06F 3/0667; G06F 3/061; G06F 12/0246; G06F 12/1045; G06F 2212/1016
See application file for complete search history.

(56) References Cited

U.S. PATENT DOCUMENTS

| 9,516,386 | B2* | 12/2016 | Melnychenko | H04N 21/435 |
| 10,102,083 | B1* | 10/2018 | Dobrean | G06F 16/113 |
| 10,826,990 | B2* | 11/2020 | Kamran | G06F 16/182 |
| 11,010,251 | B1* | 5/2021 | Soukhman | G06F 11/1451 |
| 11,093,169 | B1* | 8/2021 | Shveidel | G06F 3/064 |
| 11,163,468 | B2* | 11/2021 | O Mahony | G06F 3/0619 |
| 11,520,527 | B1* | 12/2022 | Alkalay | G06F 3/0631 |
| 2010/0325181 | A1* | 12/2010 | Skillcorn | G06F 16/13 707/829 |
| 2011/0185112 | A1* | 7/2011 | Goss | G06F 12/0246 711/E12.001 |
| 2011/0185113 | A1* | 7/2011 | Goss | G06F 12/0253 711/E12.001 |
| 2021/0286537 | A1* | 9/2021 | Shveidel | G06F 3/061 |
| 2022/0353561 | A1* | 11/2022 | Gaddy | H04N 21/4788 |
| 2024/0020225 | A1* | 1/2024 | Shveidel | G06F 12/0888 |

FOREIGN PATENT DOCUMENTS

CN 112631702 A * 4/2021

* cited by examiner

*Primary Examiner* — John A Lane
(74) *Attorney, Agent, or Firm* — Muirhead and Saturnelli, LLC

(57) ABSTRACT

In at least one embodiment, a log-structured system for metadata (MD) updates can be leveraged to enable use of variable size MD pages with multiple different encoding formats. Processing can include: generating an updated MD page by performing one or more updates to an existing version of the MD page; selecting a first page type to be used for encoding the updated MD page, wherein said selecting selects the first page type from a plurality of predefined page types, wherein each of the plurality of predefined page types identifies a different metadata layout or format for storing MD pages; encoding the updated MD page in accordance with the first page type and accordingly generating a first encoded version of the updated MD page; and storing the first encoded version of the updated MD page at a first physical storage location of a non-volatile storage device.

19 Claims, 16 Drawing Sheets

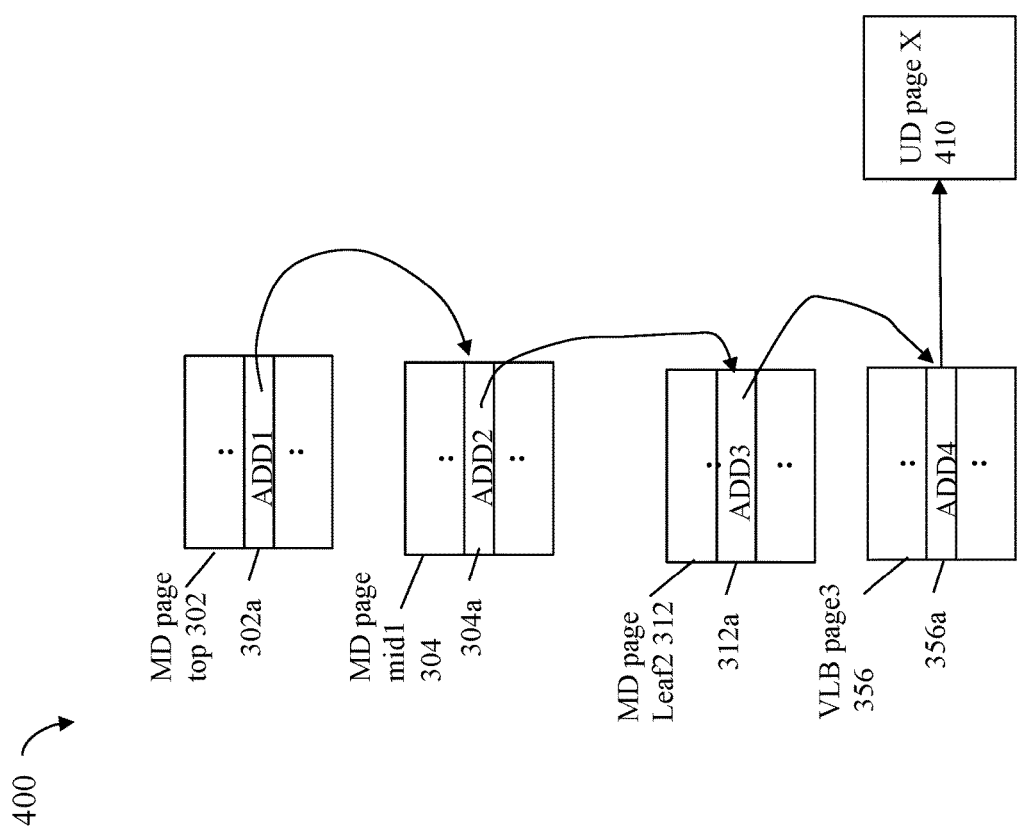

VARIABLE SIZE METADATA PAGES WITH LOG-STRUCTURED METADATA

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium. The system can include one or more processors and a memory including code stored therein that, when executed, performs the method. The non-transitory computer readable medium can include code stored thereon that, when, executed, performs the method. The method can comprise: generating an updated first metadata (MD) page by performing one or more updates to an existing version of the first MD page; selecting a first page type to be used for encoding the updated first MD page, wherein said selecting selects the first page type from a plurality of predefined page types, wherein each of the plurality of predefined page types identifies a different metadata layout or format for storing MD pages; encoding the updated first MD page in accordance with the first page type and accordingly generating a first encoded version of the updated first MD page; and storing the first encoded version of the updated first MD page at a first physical storage location of a non-volatile storage device.

In at least one embodiment, the first page type selected by said selecting can be based, at least in part, on a first actual or expected size of the first encoded version of the updated first MD page when encoded with the first page type relative to one or more other actual or expected sizes of other encoded versions of the updated first MD page when encoded with one or more others of the plurality of predefined page types. The first actual or expected size of the first encoded version of the updated first MD page can be a minimum size with respect to the first actual or expected size and the one or more other actual or expected sizes of other encoded versions of the updated first MD page.

In at least one embodiment, the first page type selected by said selecting can be based, at least in part, on costs of encoding and decoding the updated first MD page in accordance with the plurality of predefined page types. The first MD page can be one of a plurality of MD pages stored at a plurality of physical storage locations on non-volatile storage devices. The plurality of MD pages can be stored at the plurality of physical storage locations in a plurality of encoded formats or layouts based on a particular one of the plurality of predefined page types selected for each of the plurality of MD pages. Sizes, of the plurality of MD pages as stored in their respective encoded formats or layouts, can vary. Each of the plurality of MD pages can include a plurality of entries. The plurality of predefined page types can include a packed page type having an associated format or layout including a bitmap and an array of valid pointers or addresses, wherein the bitmap identifies entries of a MD page include valid pointers or addresses and which entries of a MD page include invalid pointers or addresses, and wherein the array only includes pointers or addresses for corresponding MD page entries which are identified as valid by the bitmap. The plurality of predefined page types can include a pairs page type having an associated format or layout including an array of paired values, wherein each entry of the array includes a pair of values, wherein a first value of the pair identifies a MD page position or entry including a valid address or pointer, and wherein a second value of the pair identifies an address or pointer stored at the MD page position or entry as denoted by the first value of the pair. The array may only include array entries for corresponding MD page positions or entries with valid addresses or pointers. The plurality of predefined page types can include a compressed page type having an associated format or layout including a compressed version of a MD page.

In at least one embodiment, the first encoded version of the updated first MD page can include a first page header comprising a first page size field and a first page type field, wherein the first page size field specifies a size of the first encoded version of the updated first MD page, and wherein the first page type field identifies the first page type selected by said selecting. A plurality of encoded versions of a plurality of MD pages can be stored at a plurality of physical storage locations on one or more non-volatile storage devices, wherein each of the plurality of encoded versions for a corresponding one of the plurality of MD pages can include a corresponding page header comprising a page size field and a page type field. The page size field can specify a size of said each encoded version of the corresponding MD page, and wherein the page type field can identify one of the plurality of predefined page types corresponding to said each encoded version of the corresponding MD page. The first page header and the corresponding page headers of the plurality of encoded versions of the plurality of MD pages can be a same size.

In at least one embodiment, processing can include: receiving a read request for a first entry of the first MD page; determining that data requested by the read request is not in cache thereby generating a read cache miss; and responsive to the read cache miss, performing first processing including: reading the first encoded version of the updated first MD page from the first physical storage location; decoding, in accordance with the first page type of the first page header, the first encoded version of the updated first MD page; generating, in accordance with said decoding, a decoded version of the first MD page; storing the decoded version of the first MD page, or one or more entries thereof, in cache; and in response to the read request, returning a first address or pointer stored at the first entry of the decoded version of the first MD page.

In at least one embodiment, processing can include: storing the one or more updates to the existing version of the first MD page in a MD log; flushing the one or more updates from the MD log; and responsive to said flushing, performing said generating that generates the updated first MD page. The existing version of the first MD page can be stored at a second physical storage location on a non-volatile storage device, and wherein the first physical storage location can be different from the second physical storage location.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 6B, 6C and 6D are examples illustrating a hierarchical metadata structure of metadata pages in at least one embodiment in accordance with the techniques of the present disclosure.

DETAILED DESCRIPTION OF EMBODIMENT(S)

Figure 1:
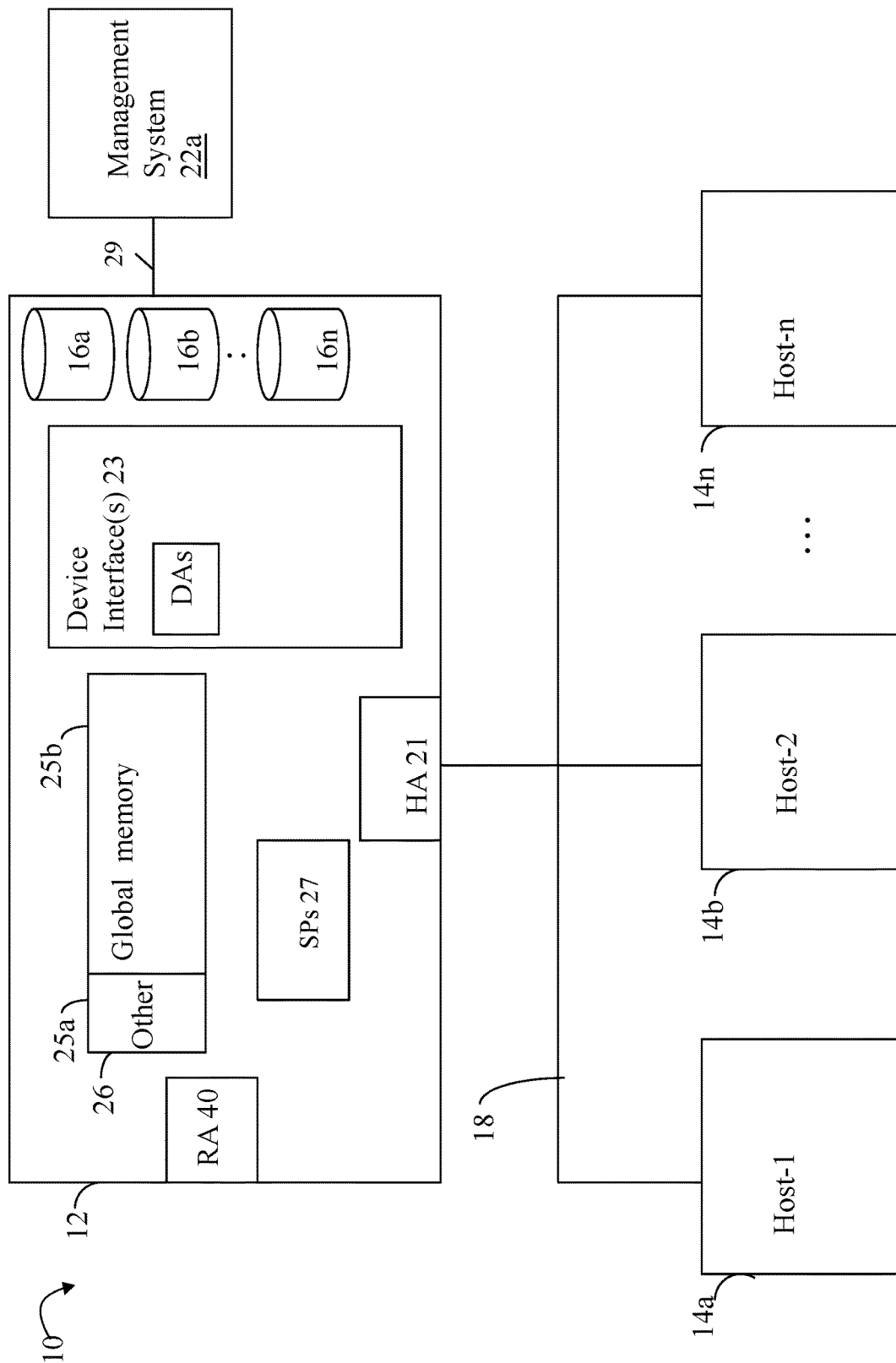
FIG. 1 is an example of components included in a system in accordance with the techniques of the present disclosure.

A data storage system can use mapping information to map a user data (UD) logical address to a corresponding physical storage location including the content stored at the UD logical address. In at least one existing system, the mapping information can include a multi-level structure of metadata (MD) pages where each such MD page can be a same fixed size. The MD pages can be persistently stored on non-volatile backend (BE) storage of the system.

In at least one existing system, each MD page when allocated obtains a unique logical address which is actually a physical address of the MD page within a storage tier of the non-volatile BE storage. Different MD pages can reference each other by their LBA and thus their respective physical addresses on the non-volatile BE storage. In such an existing system, updates to MD pages as stored on the BE storage tier can be characterized as physical "in place updates". In this case, a MD page can be stored in the same physical location which is overwritten or updated as needed. Such an existing system can implement MD page updates as "in place updates" which physically overwrite or update the same BE PD physical location storing the old data or existing content. Otherwise without using in place updates for MD pages in existing systems, a change in the physical location of a MD page when updated can require updating all references, such as other referencing MD pages, to the new physical location of the updated MD page.

The multi-level structure of fixed-size MD pages can generally provide efficient MD storage utilization when highly populated such as when used with UD logical volumes which are highly populated in relatively contiguous portions of UD logical address space. However, the multi-level structure of fixed-size MD pages can be space inefficient in other cases where the logical volumes storing UD or content are sparse. For example, a MD page can store information for a UD logical address range where only one block of the range is actually written to and thus stores valid data. In such a scenario, the fixed-size MD page can include an entry for each block of the UD logical address range where only one corresponding entry of the MD page is actually utilized and valid, and the remaining entries of the MD page correspond to UD logical addresses which are unused or contain invalid content. Thus, the storage for the remaining entries of the MD page can be characterized as wasted or used inefficiently. In at least one existing system, the foregoing storage space inefficiency can be even more adverse in connection with snapshotting operations which can include, for example, replicating sparsely utilized MD pages of a source object in connection with creating a snapshot of the source object.

To overcome the foregoing drawbacks, described in the present disclosure are techniques used to provide efficient storage utilization in connection with MD pages which can be stored on non-volatile BE storage of a data storage system. The techniques of this disclosure provide for increased MD space utilization and a general reduction in the size of the MD space requirements. In at least one embodiment, the techniques of the present disclosure use a log-structured system (LSS) approach and architecture in connection with the MD pages, and also implement variable size MD pages. In at least one embodiment, such variable size MD pages may not store invalid pointers and can rather store only valid pointers associated with logical addresses storing valid content.

In at least one embodiment, the techniques of the present disclosure use an LSS approach and architecture in connection with the metadata, and in particular, the updates to the MD pages. Use of an LSS eliminates constraints and limitations imposed by an "update in place" approach. Consistent with other discussion herein in at least one embodiment, updates or modifications can be with respect to metadata, such as updates or modifications to the MD pages of the MD structure or mapping information. In at least one embodiment to increase performance, the updates to the MD pages or mapping information can be stored (e.g., persisted temporarily) in a metadata log. One characteristic of an LSS, such as in connection with the metadata log, is that updates or modifications (which are recorded in an associated log and then flushed to long term storage of the BE PDs) do not physically overwrite or update the same BE PD physical location storing the old data or existing content (e.g., no physical in place update). Rather with an LSS, the newly written or updated data is typically written to a different physical location on the BE PDs. In at least one embodiment in accordance with the techniques of the present disclosure, use of an LSS approach with a MD log enables use of the more storage efficient variable size MD pages.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which can also referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
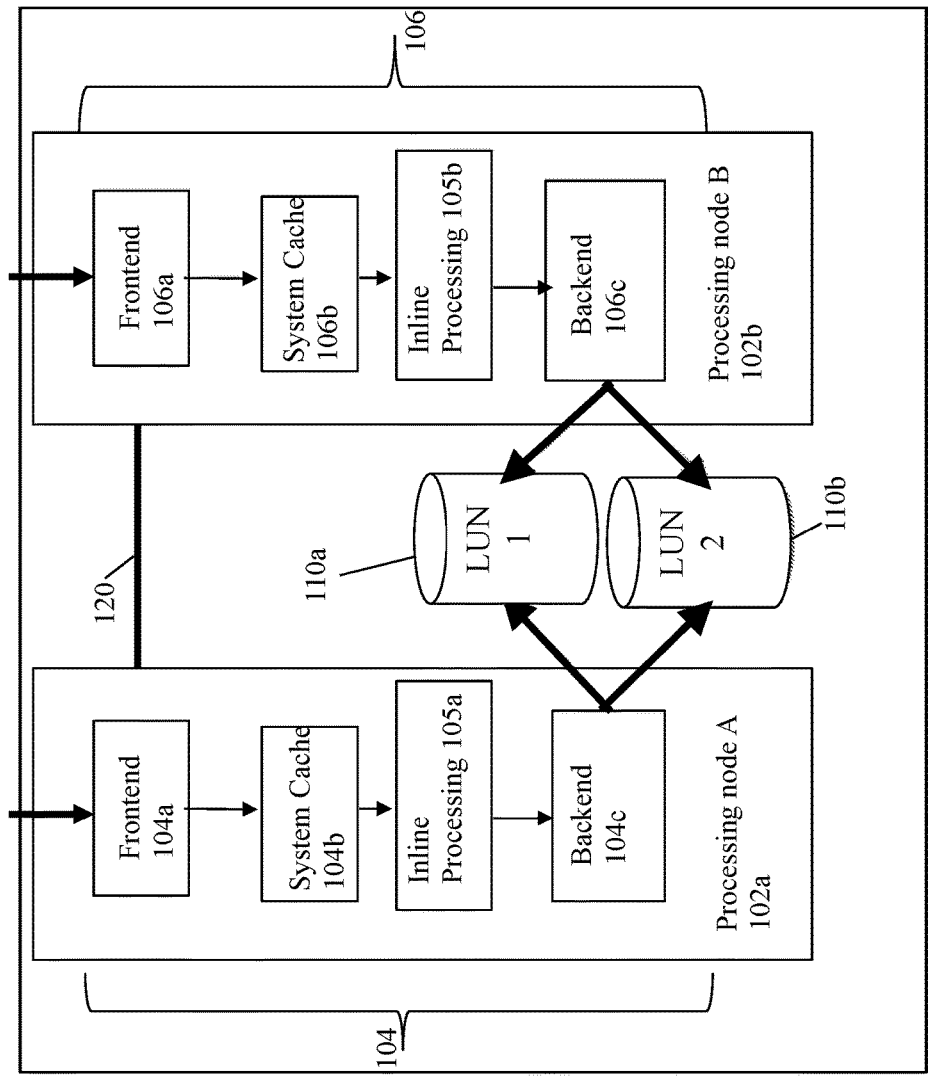
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 100, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and BE component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache (e.g., cache hit or read cache hit), the read data block is retrieved from the system cache 104b and returned to the host. Otherwise, if the requested read data block is not in the system cache 104b (e.g., cache miss or read cache miss) but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
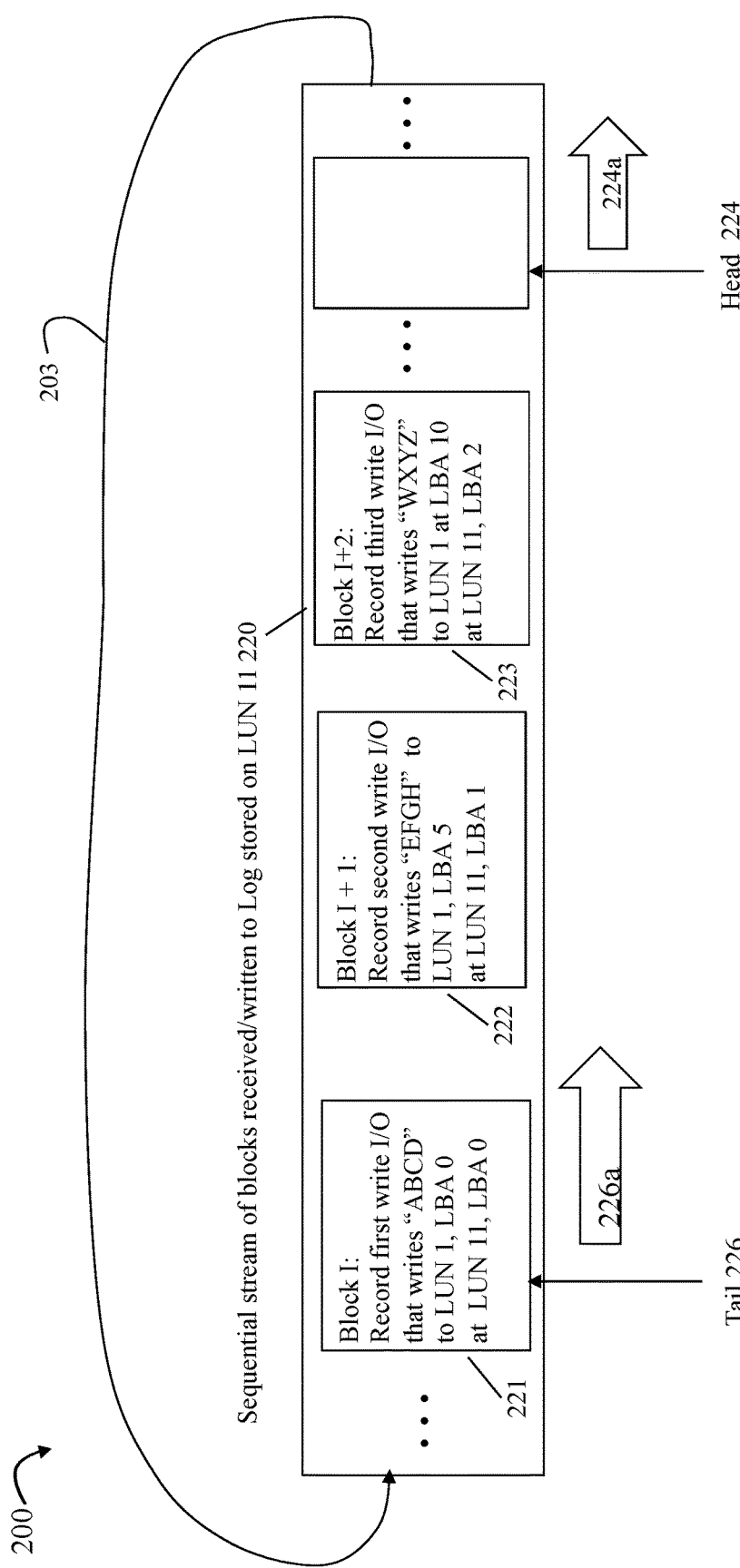
FIGS. 3, 4, 5 and 6A are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described in more detail in the following paragraphs. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
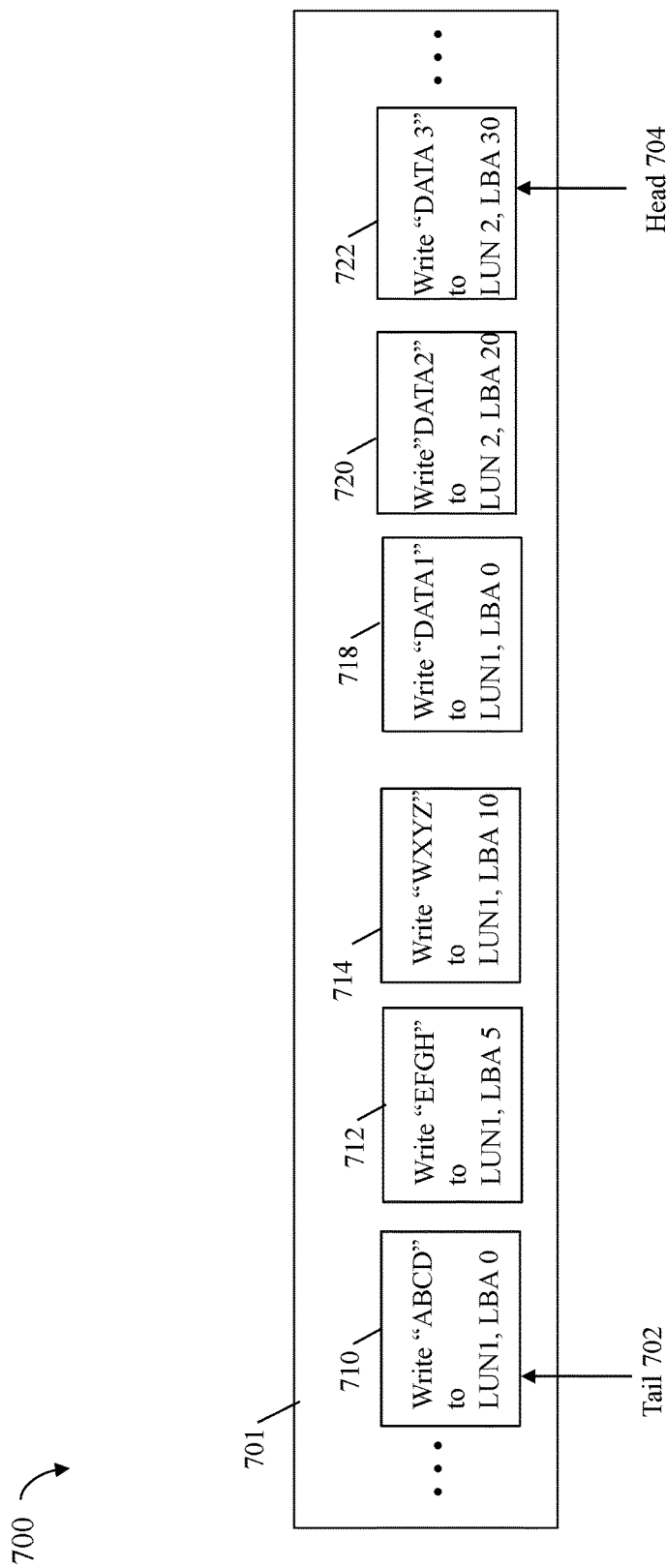

Referring to FIG. 4, shown is an example of information that can be included in a log 701 in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

Figure 5:
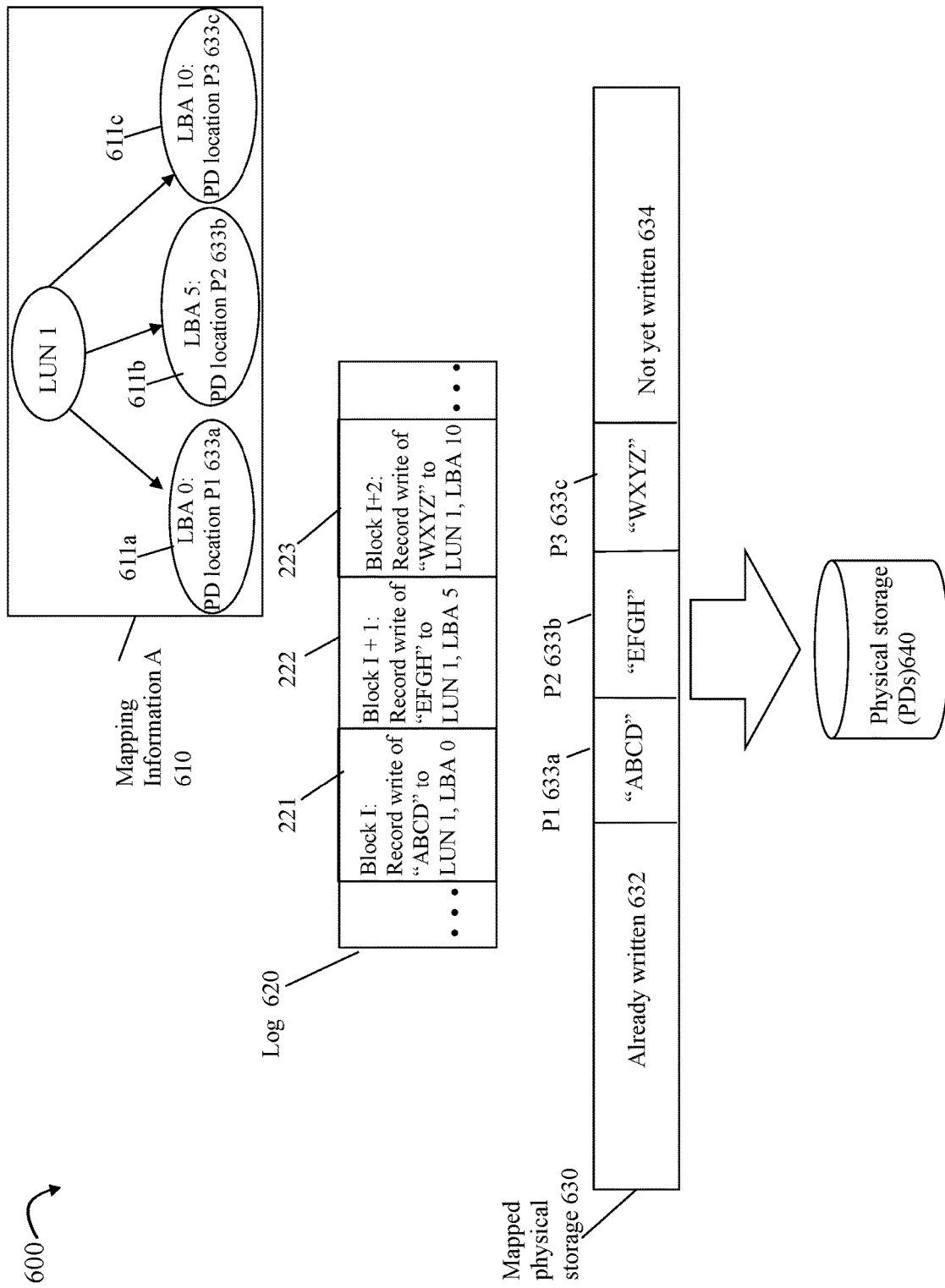

Referring to FIG. 5, shown is an example 600 illustrating the flushing of logged writes and the physical data layout of data on BE PDs in at least one embodiment in accordance with the techniques of the present disclosure. FIG. 5 includes the log 620, the mapping information A 610, and the physical storage (i.e., BE PDs) 640. The element 630 represents the physical layout of the data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which data, such as written user data, can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223. Generally, data from multiple log entries of the log 620 can be combined into a larger chunk that is written out to physical storage of the BE PDs.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5 containing the data prior to being flushed to the physical storage 630 of the BE PDs. As a recorded write operation that writes write data to a particular logical address, such as a LUN and LBA, is flushed from an entry of the log 620, mapping information that maps the particular logical address to the physical storage location including the write data or content stored at the particular logical address can be accordingly updated.

Figure 6A:
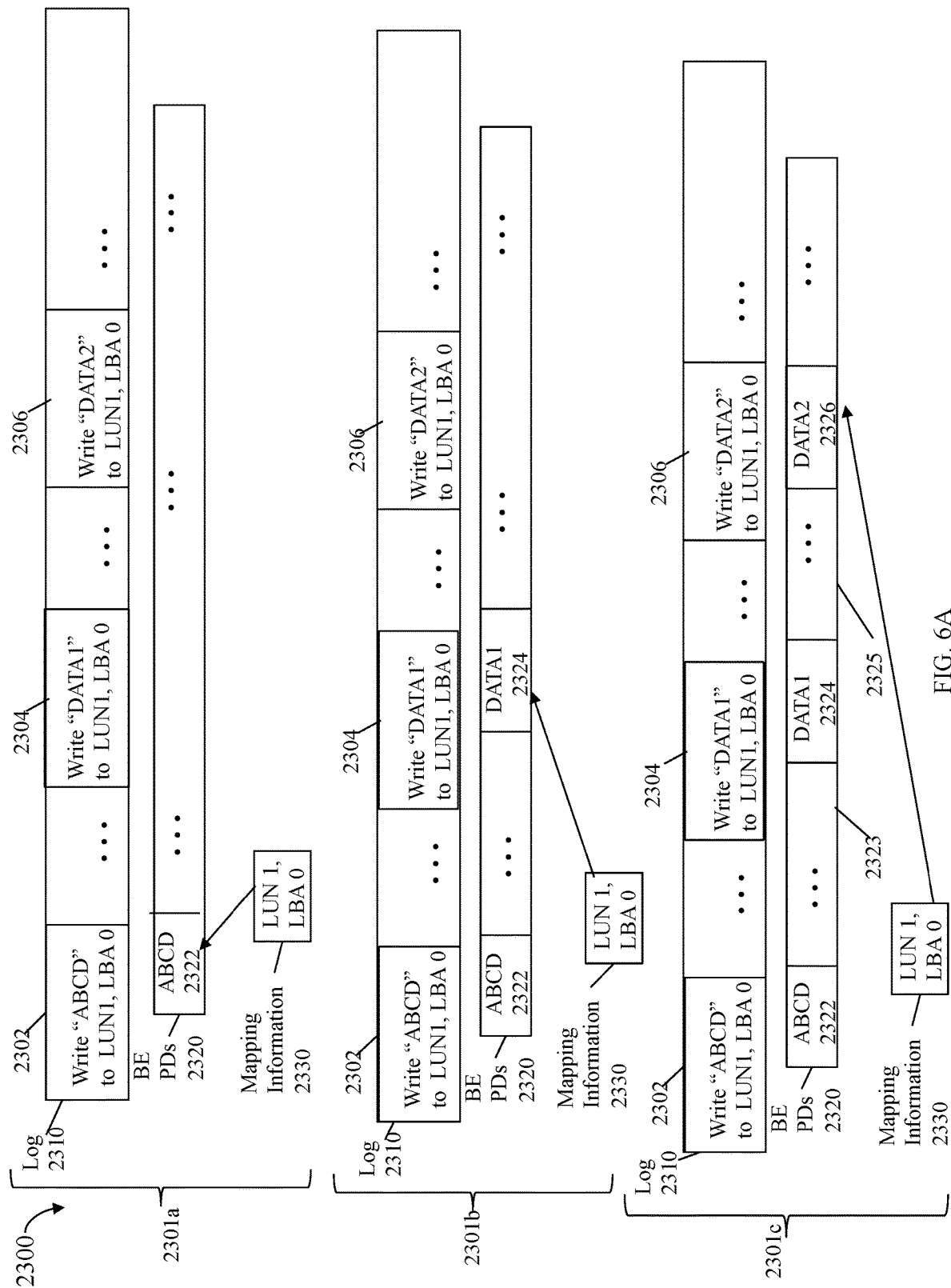

For example with reference to FIG. 6A, the element 2301a can denote the state of the log file 2310, BE PDs 2320 and mapping information 2330 at a first point in time T1 after processing the record 2302 for a first write of "ABCD" to the logical address LUN A, LBA 0. The data written "ABCD" by the recorded write of 2302 can be stored at the BE PD location 2322. Thus, flushing the log record 2302 results in storing the write data "ABCD" to the BE PD location 2322 and additionally updating the mapping information 2330 to reference the BE PD location 2322. The mapping information 2330 denotes the metadata used to map the logical address LUN 1, LBA 0 to the current physical location on the BE PDs containing the user data or content stored at the logical address LUN 1, LBA 0. After the log record 2302 is flushed from the log 2310, the record 2302 is available and can be subsequently reclaimed for reuse for logging other operations in the log 2310.

At a second point in time T2 subsequent to T1, the log record 2304 can be processed and flushed to the BE PDs 320. The element 301b denotes the state of the log file 2310, BE PDs 2320 and mapping information 2330 at the second point in time T2 after processing the record 2304 for a second write of "DATA1" to the logical address LUN A, LBA 0. The data written "DATA1" by the recorded write of 2304 can be stored at the BE PD location 3224. Thus, flushing the log record 2304 results in storing the write data "DATA1" to the BE PD location 2324 and additionally updating the mapping information 2330 to reference the BE PD location 2324 denoting the physical location containing the data stored at the LUN 1, LBA 0 at the time T2. Additionally, the PD location 2322 can be invalidated since it no longer contains valid current data for the logical address LUN 1, LBA 0, whereby the PD location 2322 can be available for reuse. After the log record 2304 is flushed from the log 2310, the record 2304 is available and can be subsequently reclaimed for reuse for logging other operations in the log 2310.

At a third point in time T3 subsequent to T2, the log record 2306 can be processed and flushed to the BE PDs 2320. The element 2301c denotes the state of the log file 2310, BE PDs 2320 and mapping information 330 at the third point in time T3 after processing the record 2306 for a third write of "DATA2" to the logical address LUN A, LBA 0. The data written "DATA2" by the recorded write of 2306 can be stored at the BE PD location 2326. Thus, flushing the log record 2306 results in storing the write data "DATA2" to the BE PD location 2326 and additionally updating the mapping information 2330 to reference the BE PD location 2326 denoting the physical location containing the data stored at the LUN 1, LBA 0 at the time T3. Additionally, the PD location 2324 can be invalidated since it no longer contains valid current data for the logical address LUN 1, LBA 0, whereby the PD location 2324 can be available for reuse. After the log record 2306 is flushed from the log 2310, the record 2306 is available and can be subsequently reclaimed for reuse for logging other operations in the log 2310.

It should be noted that the flushing of the log can be performed in response to an occurrence of any one or more defined conditions. For example, the log can be flushed in response to determining that the amount of reclaimed log space available for use and allocation is less than a specified threshold amount or size.

Consistent with discussion above, the mapping information (sometimes referred to as a mapping structure, metadata structure or simply metadata (MD)) can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location on the BE PDs containing the content or data stored at the logical address. In at least one embodiment, the mapping information includes a MD structure that is hierarchical structure of multiple layers of MD pages or blocks.

In at least one embodiment, the mapping information or structure for a LUN, such as LUN 1 described above in connection with FIGS. 3, 4, 5 and 6A, can be in the form of a tree having a plurality of levels of MD pages. More generally, the mapping structure can be in the form of any ordered list or hierarchical structure. In at least one embodiment, the mapping structure for a LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes.

Figure 6B:
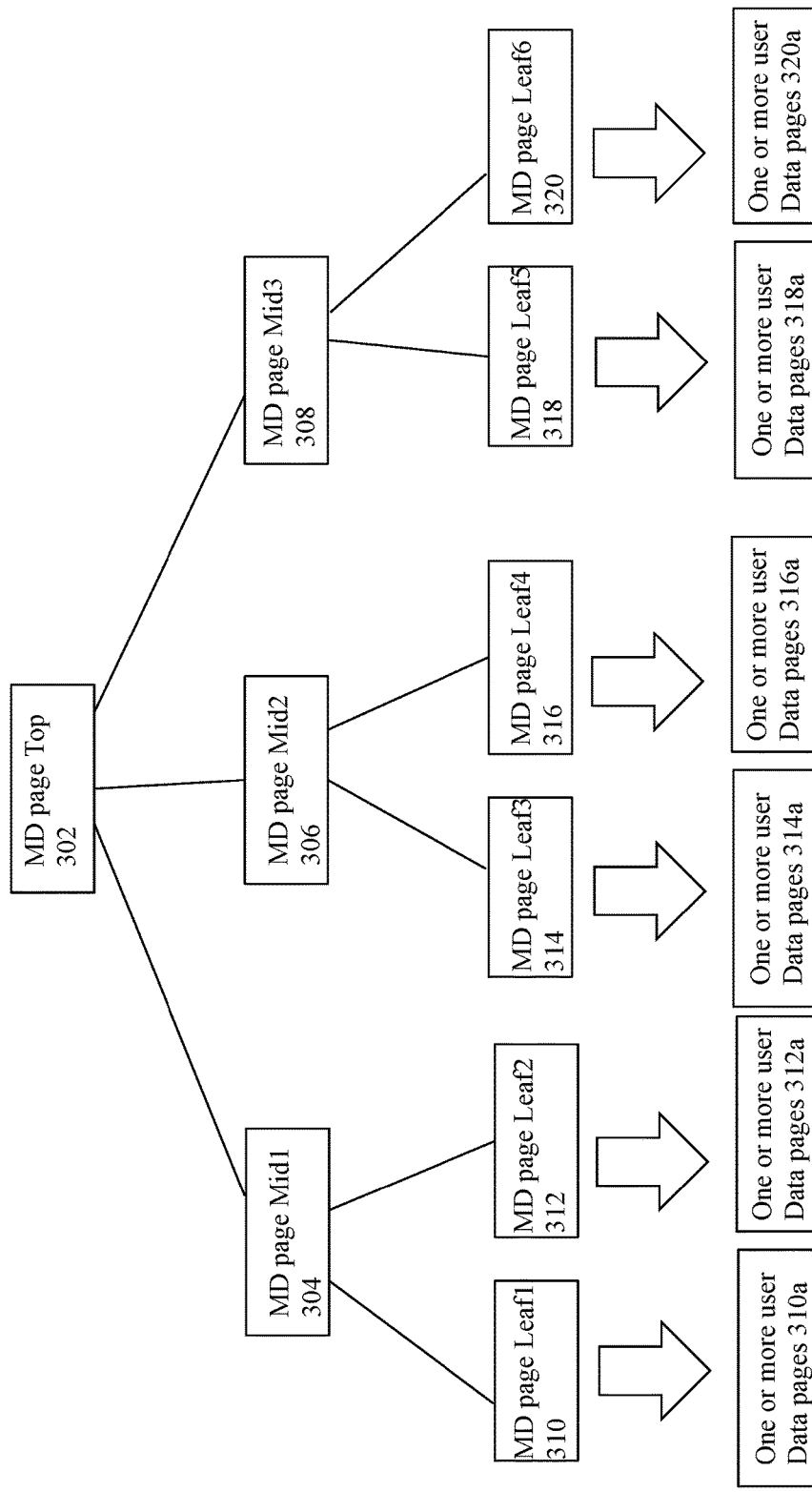
Figure 6C:
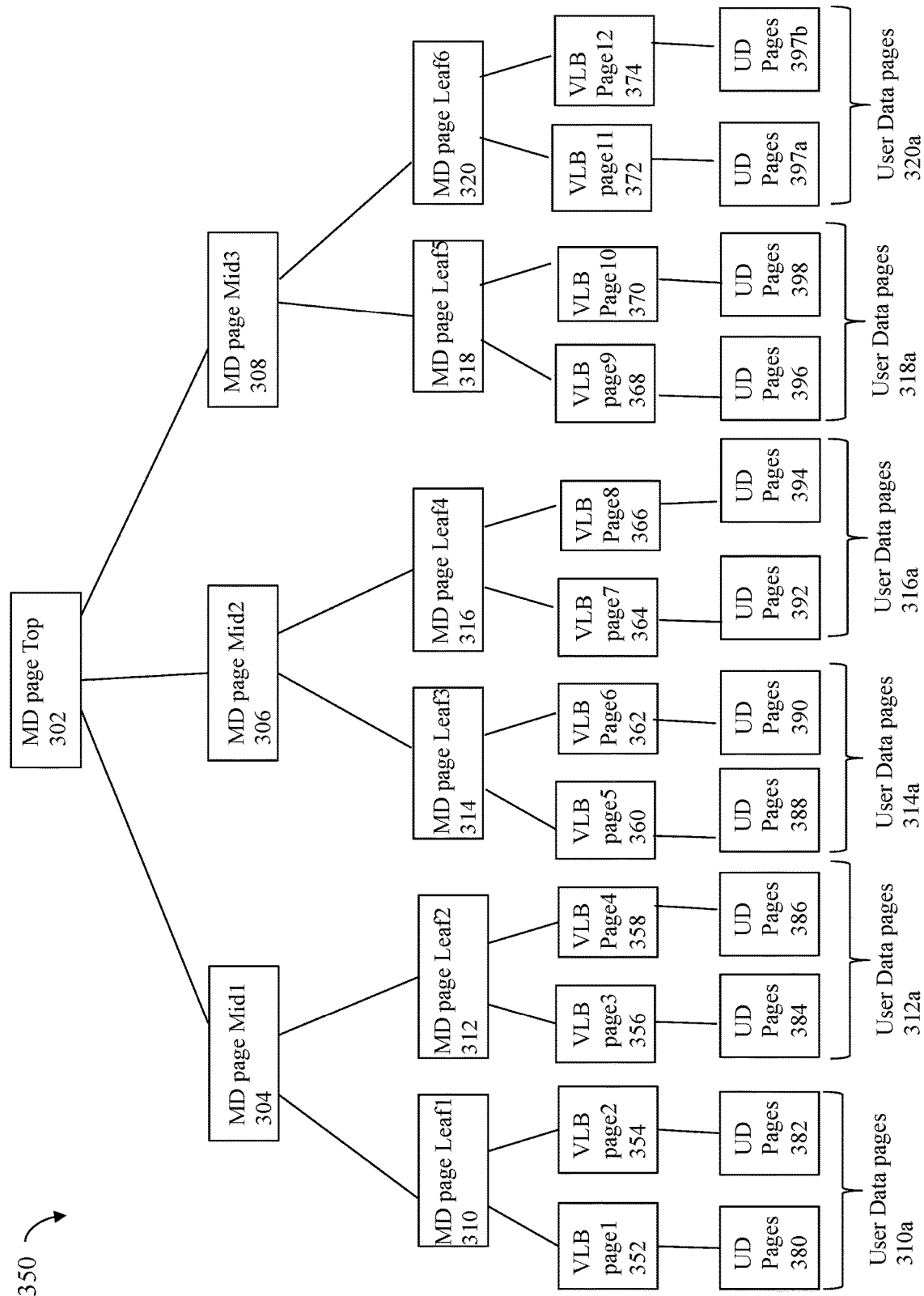

For simplicity of illustration, the tree structure of MD pages, corresponding to the mapping structure in at least one embodiment, is represented in subsequent FIGS. 6B and 6C as including only 3 levels where each node in the tree can have at most 3 child nodes. Generally, the techniques herein can be used with any layered or hierarchical structure of MD pages.

Referring to FIG. 6B, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 6B, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Referring to FIG. 6C, shown is a more detailed version of a hierarchical structure used as the mapping structure 108 that can be used in an embodiment in accordance with the techniques of the present disclosure. The structure 350 is similar to the structure 300 as described and illustrated in FIG. 6B with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 6B. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 6B including data for LBAs 0-511. The UD pages 384 and 386 denote two portions of UD pages corresponding to UD pages 312a of FIG. 6B including data for LBAs 512-1023. The UD pages 388 and 390 denote two portions of UD pages corresponding to UD pages 314a of FIG. 6B including data for LBAs 1024-1535. The UD pages 392 and 394 denote two portions of UD pages corresponding to UD pages 316a of FIG. 6B including data for LBAs 1536-2047. The UD pages 396 and 398 denote two portions of UD pages corresponding to UD pages 318a of FIG. 6B including data for LBAs 2048-2559. The UD pages 397a and 397b denote two portions of UD pages corresponding to UD pages 320a of FIG. 6B including data for LBAs 2560-3072.

In furtherance of the example above regarding UD page X and now with reference to FIG. 6C, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Referring to FIG. 6D, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 6D includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 6B-D.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 6B-D. In at least one embodiment, the MD or mapping information used in connection with stored user data can be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure. In at least one embodiment, content recorded persistently in the log can also be stored in volatile memory cache of each node. When write data is flushed by a node, it can be flushed from the log and the volatile memory cache of the node. In at least one embodiment, write data can remain in the volatile memory cache of the node while the write data is in the log and has not yet been flushed from the log to BE non-volatile storage.

In at least one embodiment, updates or modifications to the MD pages of the MD or mapping structure described in connection with the FIGS. 6B-D can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 6B-D can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 6B-D).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 6E:
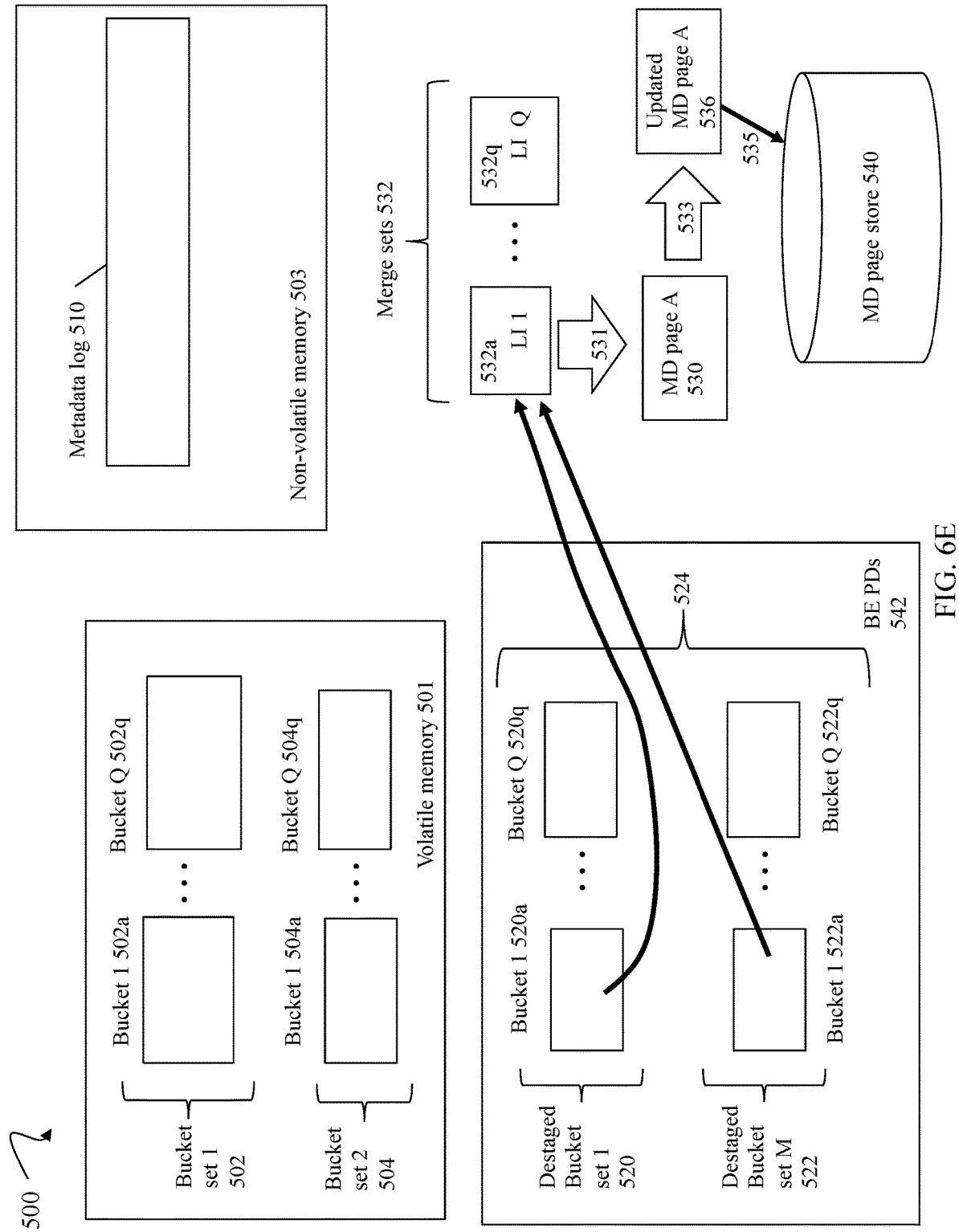
FIG. 6E is an example of structures and associated data flow in connection with a metadata log infrastructure in at least one embodiment in accordance with the techniques of the present disclosure.

Referring to FIG. 6E, shown is an example 500 illustrating structures and associated data flow in at least one embodiment of a data storage system.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520*a*, 522*a*) in each of the M destaged bucket sets of 524. The second phase of destaging can aggregate and combine the metadata updates for the MD page A 530 from the first buckets (e.g., 520*a*, 522*a*) across the multiple M destaged sets 524 of metadata updates as stored on the BE PDs 542 in the first phase of destaging. The element 532*a* can denote the merge set of aggregated updates from the first buckets 520*a*, 522*a* of the destaged sets 524 for the MD page A 530. Thus the merge set or working set 532*a* of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532*a* of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532*a*-*q* based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

In at least one system, updates to the MD page can be stored in the metadata log, where the logged MD update is persistently stored in the non-volatile memory metadata log 510 (stored in non-volatile storage 503 which can be NVM-RAM) and where the logged MD update is also stored in an in-memory log structure, such as an active one of the bucket sets 502, 504 stored in each node's local volatile memory. In the in-memory log structure in at least one embodiment, each individual update to a particular MD page can be recorded as a separate entry in a bucket of updates associated with the particular MD page. Subsequently, the updates to the MD page as recorded in the in-memory metadata log can be destaged and applied to a persistently stored copy of the MD page. Logging the MD updates of the MD pages can result in improved performance.

With reference back to FIG. 6E, the non-volatile metadata log 510 or the persisted metadata log or journal may also be referred to as an RDL or raw persisted or non-volatile MD data log; and a single bucket set, such as each of 502 and 504, of the volatile in-memory metadata log, may also be referred to an HBSB (hash-based sorted buckets). Thus, consistent with discussion above such as with reference back to FIG. 6E, each node can have an active HBSB, such as bucket set 502, and an inactive or destaging HBSB, such as bucket set 504. A pair of HBSBs including an active bucket set and an inactive or destaging bucket set, may also be referred to as an in-memory or volatile memory MD log denoting a single instance of an in-memory MD log. Thus, as shown in FIG. 6E, a storage node can write copies of delta updates as tuples to both the in-memory MD log and also the RDL or non-volatile MD log. The RDL or non-volatile MD log can persistently store the respective tuples, deltas or MD updates in a time order sequence such as from older to newest. In contrast, MD updates, deltas or tuples stored in the in-memory MD log local to a storage node can be organized in a different manner to facilitate efficient and quick retrieval organized in hash buckets as discussed elsewhere herein. Within each hash bucket including MD updates for a single corresponding MD page, the MD updates, deltas or tuples can be organized in any suitable manner such as in a time order sequence based on when the MD updates are received at the storage node.

In at least one existing data storage system such as with a dual node configuration, each storage node can maintain a single local instance of an in-memory MD log where both nodes can share a single instance of the RDL or non-volatile MD log. In the event of disaster, data loss and/or data corruption, a storage node can replay the non-volatile MD log to apply delta update tuples stored in the non-volatile MD log to the node's local in-memory MD log to thereby restore or recover the node's in-memory MD log to a valid and consistent state.

In at least one embodiment, the techniques of the present disclosure can use a MD log as described herein which includes both a persistent MD log such as the RDL 510, as well as a per node in-memory or volatile MD log such as one including the HBSBs 502, 504.

As discussed above, a data storage system can use mapping information to map a user data (UD) logical address to a corresponding physical storage location including the content stored at the UD logical address. In at least one existing system, the mapping information can include a multi-level structure of metadata (MD) pages where each such MD page can be a same fixed size. The MD pages can be persistently stored on non-volatile backend (BE) storage of the system.

In at least one existing system, each MD page when allocated obtains a unique logical address which is actually a physical address of the MD page within a storage tier of the non-volatile BE storage. Different MD pages can reference each other by their LBA and thus their respective physical addresses on the non-volatile BE storage. In such an existing system, updates to MD pages as stored on the BE storage tier can be characterized as physical "in place updates". In this case, a MD page can be stored in the same physical location which is overwritten or updated as needed. Such an existing system can implement MD page updates as "in place updates" which physically overwrite or update the same BE PD physical location storing the old data or existing content. Otherwise without using in place updates for MD pages in existing systems, a change in the physical location of a MD page when updated can require updating all references, such as other referencing MD pages, to the new physical location of the updated MD page.

The multi-level structure of fixed-size MD pages can generally provide efficient MD storage utilization when highly populated such as when used with UD logical volumes which are highly populated in relatively contiguous portions of UD logical address space. However, the multi-level structure of fixed-size MD pages can be space inefficient in other cases where the logical volumes storing UD or content are sparse. For example, a MD page can store information for a UD logical address range where only one block of the range is actually written to and thus stores valid data. In such a scenario, the fixed-size MD page can include an entry for each block of the UD logical address range where only one corresponding entry of the MD page is actually utilized and valid, and the remaining entries of the MD page correspond to UD logical addresses which are unused or contain invalid content. Thus, the storage for the remaining entries of the MD page can be characterized as wasted or used inefficiently. In at least one existing system, the foregoing storage space inefficiency can be even more adverse in connection with snapshotting operations which can include, for example, replicating sparsely utilized MD pages of a source object in connection with creating a snapshot of the source object.

To overcome the foregoing drawbacks, described in the present disclosure are techniques used to provide efficient storage utilization in connection with MD pages which can be stored on non-volatile BE storage of a data storage system. The techniques of this disclosure provide for increased MD space utilization and a general reduction in the size of the MD space requirements. In at least one embodiment, the techniques of the present disclosure use a log-structured system (LSS) approach and architecture in connection with the MD pages, and also implement variable size MD pages. In at least one embodiment, such variable size MD pages can store only valid pointers associated with logical addresses storing valid content.

In at least one embodiment, the techniques of the present disclosure use an LSS approach and architecture in connection with the metadata, and in particular, the updates to the MD pages. Use of an LSS eliminates constraints and limitations imposed by an "update in place" approach. Consistent with other discussion herein in at least one embodiment, updates or modifications can be with respect to metadata, such as updates or modifications to the MD pages of the MD structure or mapping information. In at least one embodiment to increase performance, the updates to the MD pages or mapping information can be stored (e.g., persisted temporarily) in a metadata log. One characteristic of an LSS, such as in connection with the metadata log, is that updates or modifications (which are recorded in an associated log and then flushed to long term storage of the BE PDs) do not physically overwrite or update the same BE PD physical location storing the old data or existing content (e.g., no physical in place update). Rather with an LSS, the newly written or updated data is typically written to a different physical location on the BE PDs. In at least one embodiment in accordance with the techniques of the present disclosure, use of an LSS approach with a MD log enables use of the more storage efficient variable size MD pages.

The foregoing and other aspects of the techniques of the present disclosure are described in more detail in the following paragraphs.

In at least one embodiment, the techniques of the present disclosure use an LSS approach and architecture in connection with both the user data and the metadata. Use of an LSS eliminates constraints and limitations imposed by an "update in place" approach. Consistent with other discussion herein in at least one embodiment, updates or modifications can be with respect to user data or stored content modified by client or host write I/Os as well as with respect to metadata, such as updates or modifications to the MD pages of the MD structure or mapping information described elsewhere herein. In at least one embodiment to increase performance, the updates to user data can be stored (e.g., persisted temporarily) in a log or journal logging client or host writes, and the updates to the MD or mapping information can be stored (e.g., persisted temporarily) in a metadata log. As noted above one characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs.

In at least one embodiment, MD pages, such as top, mid and leaf MD pages, can be maintained to include only valid pointers or addresses associated with UD logical addresses storing valid content, thereby omitting storing invalid pointer or addresses of invalid or unused MD page entries. The foregoing of only storing such valid pointers of valid, used MD page entries allows for a reduction in the MD storage requirements and footprint especially in sparse use case scenarios. However, in such an embodiment, it means that the MD pages, such as MD top, mid and leaf pages, can vary in size. Thus the MD pages which can vary in size can be maintained as variable size objects. Use of an LSS for MD page updates enables the techniques of the present disclosure to use variable size MD pages since LSS-based MD page updates are not "in place" updates. With an LSS using a MD log in an embodiment in accordance with the techniques of the present disclosure, the updated MD page is written to a new different physical location, where the updated MD page can have a different size than a previous size of the MD page.

Figure 7A:
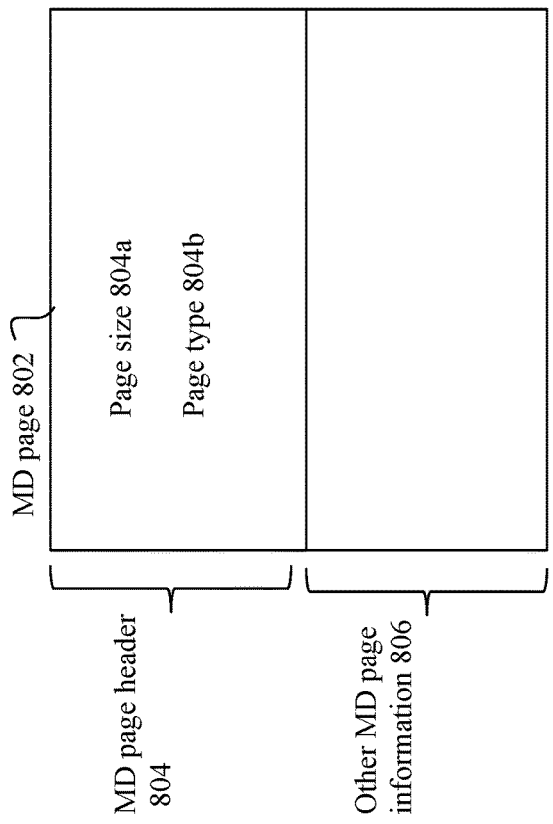
FIGS. 7A-7D are examples illustrating variable size MD page layouts in at least one embodiment in accordance with the techniques of the present disclosure.

Referring to FIG. 7A, shown is an example 800 of a MD page in at least on embodiment in accordance with the techniques of present disclosure.

The MD page 802 can include a MD page header 804 and other MD page information 806. The MD page header 804 can be a fixed size and can include a page size 804*a* and page type 804*b*. The page size 804*a* indicates the actual size, such as in bytes or other suitable storage units, of the MD page 802. The page type 804*b* can identify one of multiple predefined page types. The other MD page information 806, and thus the size of 806, can vary with the particular value of 804*b* identifying one of the predefined page types for a particular MD page instance. In at least one embodiment, the page size 844*a* can be an aggregate size of both the MD page header 804 and the size of the other MD page information 806, where the size of 804 is fixed and the size of 806 can vary with the particular page type.

In at least one embodiment, the particular page type 804*b* can also define the format or layout of the subsequently stored other MD page information 806, such as stored on the non-volatile BE PDs in a data storage system. In particular, the specified page type 804*b* can define the format or layout as to how the valid entries of valid pointers to other MD pages, or entries thereof, are organized within the other MD page information 806. The MD page header 804 can also optionally include other information than as illustrated in the example 800.

On each MD page update, both the page size 804*a* and the page type 804*b* can be evaluated and updated as needed. Consistent with other discussion herein, a MD page update can result, for example, from a new or first time write to a logical address, an overwrite or update to existing content of a logical address, and the like. In connection with the foregoing scenarios with respect to a write that writes content C1 to a logical address, an entry of MD leaf page corresponding to the logical address, for example, can be updated to point to, or reference, a VLB page entry which further points to or references a physical storage location or block storing C1 (e.g., see for example FIG. 6D).

The page type, and thus the format, of a MD page can be evaluated, and changed if needed, upon any update of the MD page, depending on the number and sparseness of actual pointers or addresses inside the MD page. Consistent with discussion elsewhere herein in at least one embodiment, each top, mid and leaf MD page when in its original decoded format can include a number of entries, such as 512 entries, where each such MD page entry can be an address, reference or pointer to another MD page entry. Thus such as described in connection with FIG. 6D and elsewhere herein, MD pages can be included in a chain of mapping information which maps a UD logical address to a corresponding physical location storing content of the UD logical address. When in the decoded format, each MD page entry can be characterized as either valid or invalid. If a MD page entry is valid, the MD page entry includes a valid address, reference or pointer which is included in a chain of MD pages or mapping information associated with mapping a logical address to a corresponding physical storage location containing the content stored at the logical address. If a MD page entry is invalid, the MD page entry rather can be characterized as storing an invalid address, reference or pointer. Put another way, the invalid MD page entry, storing an invalid address or pointer, is not associated with a UD logical address and is not included in a chain of MD pages which reference each other as discussed above and elsewhere herein with a valid MD page entry storing a valid address of pointer.

In at least one embodiment, one of the predefined page types can be selected which provides the minimum footprint or storage for the particular MD page being updated and stored on the BE PDs.

In at least one embodiment, the following page types can be defined: Packed, Pairs, and Compressed. An embodiment can also include other page types than as described herein.

The Packed page type denotes that the other MD page information 806 includes a pointer existence bitmap (sometimes simply referred to as a bitmap or existence bitmap) and a packed array of pointers (sometimes referred to as an array of pointers or array of valid pointers). In at least one embodiment where a MD page can include 512 MD page entries, the bitmap can include 512 bitmap entries. The bitmap can include a unique corresponding bitmap entry for each of the 512 MD page entries. If a bitmap entry corresponding to a MD page entry has a value of 1, it means that the array of pointers includes a valid pointer for the MD page entry. Otherwise, if the bitmap entry corresponding to a MD page entry has a value of 0, it means that the array of pointers does not include any entry for, and thus does not include a pointer for, the MD page entry. Thus, the number of bitmap entries having a value of 1 indicates the number of entries in the subsequently stored array of pointers. Thus in at least one embodiment, the array of pointers can store only valid pointers corresponding to valid MD page entries of the MD page.

To further illustrate, assume that bitmap indicates that there are 3 valid pointers for MD page entries 3, 10 and 11. In this case, the bitmap includes values of 1 for bitmap entries 3, 10 and 11; the bitmap includes values of 0 for all other remaining 509 bitmap entries; and the array of pointers includes only 3 entries for 3 pointers or addresses. The sequential order or layout of valid pointers in the array of pointers corresponds to the relative sequential order of the corresponding bitmap entries. For example, let A denote the pointer or address of MD page entry 3, let B denote the pointer or address of MD page entry 10, and let C denote the pointer or address of MD page entry 11. In this case, the array of pointers can include, in the following consecutive sequential order: A, B, C.

Figure 7B:
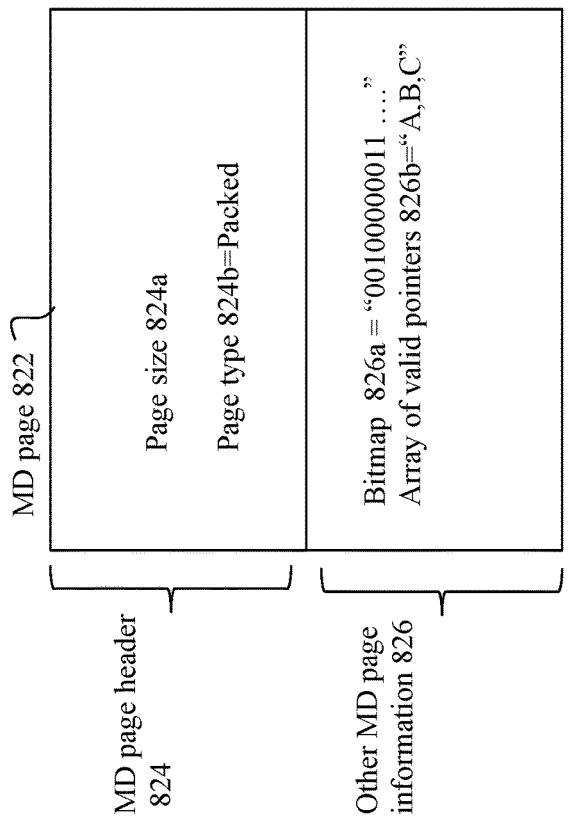

Referring to FIG. 7B, shown is an example 820 illustrating a MD page with a page type of Packed in at least one embodiment in accordance with the techniques of the present disclosure. The MD page 822 includes a MD page header 824 with a page size 824*a* (similar to 822*a* of FIG. 7A) and a page type 824*b* of Packed. The page type 824*b* of Packed indicates that the layout or format of the other MD page information 826 includes a bitmap 826*a* and an array of valid pointers 826*b*. In connection with the above example with only 3 valid pointers for MD page entries 3, 10 and 11, the bitmap 826*a* (assuming 1 based array indexing) can be "00100000011 . . . ." (e.g., includes values of 1 for bitmap entries 3, 10 and 11, and 0 for all other remaining 509 bitmap entries); and the array of valid pointers 826*b* can be "A, B, C" and include only 3 entries for 3 valid pointers or addresses. Note the order of the pointers or addresses of 826*b* corresponds to the relative order and position of the 3 corresponding bitmap entries which are 1 (e.g., the first valid pointer A corresponds to the first valid bitmap entry 3 for MD page entry 3, the second valid pointer B corresponds to the second valid bitmap entry 10 for MD page entry 10, and the third valid pointer C corresponds to the third valid bitmap entry 11 for MD page entry 11).

The Pairs page type denotes that the other MD page information 806 includes an array of "position: pointer" pairs, where position denotes the position or entry of the MD page and pointer denotes the pointer or address stored in the corresponding position or entry of the MD page. With the Pairs page type, there is no bitmap as with the Packed page type. Rather the particular position or entry of the MD page is explicitly paired with a particular pointer or address in an entry of the position:pointer array. Thus, the number of entries in the position:pointer array for a MD page is equal to the number of valid pointers stored in the MD page. Thus in at least one embodiment, the array of position:pointer pairs can store only valid pointers. If there is no entry in the array of position:pointer pairs which corresponds to a particular MD page entry, then the particular MD page entry includes an invalid pointer or address.

To further illustrate, assume that the MD page includes only 3 valid pointers for MD page entries 3, 10 and 11 as discussed above. In this case, the position: pointer array includes only 3 entries for the 3 valid pointers or addresses. For example, let A denote the pointer or address of MD page entry 3, let B denote the pointer or address of MD page entry 10, and let C denote the pointer or address of MD page entry 11. In this case, the position:pointer array can include only the following 3 entries: 3A, 10B, 11C, where each entry can be a pair, and each pair can identify a MD page position or entry and a corresponding pointer or address stored in the position or entry of the pair.

Figure 7C:
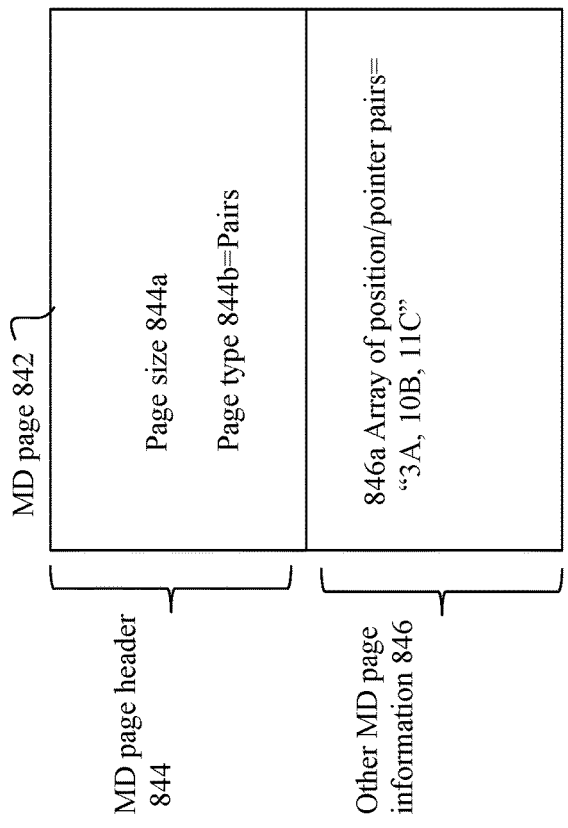

Referring to FIG. 7C, shown is an example 840 illustrating a MD page with a page type of Pairs in at least one embodiment in accordance with the techniques of the present disclosure. The MD page 842 includes a MD page header 844 with a page size 844*a* (similar to 822*a* of FIG. 7A) and a page type 844*b* of Pairs. The page type 844*b* of pairs indicates that the layout or format of the other MD page information 846 includes an array of valid position/pointer pairs 846*a*. In connection with the above example with only 3 valid pointers for MD page entries 3, 10 and 11, the array of valid position/pointer pairs 846*a* can be "3A, 10B, 11C" and include only 3 entries for 3 valid pointers or addresses.

The Compressed page type denotes that the MD page is the original MD page which is compressed and then stored in its compressed form on the BE PDs. Thus, for example, if the MD page includes 512 entries with a mix of valid and invalid (unused) entries and pointers, the original MD page (including both valid and invalid pointers or addresses) can be compressed. Subsequently, the compressed form of the MD page can be stored as the content of the other MD page information field.

Figure 7D:
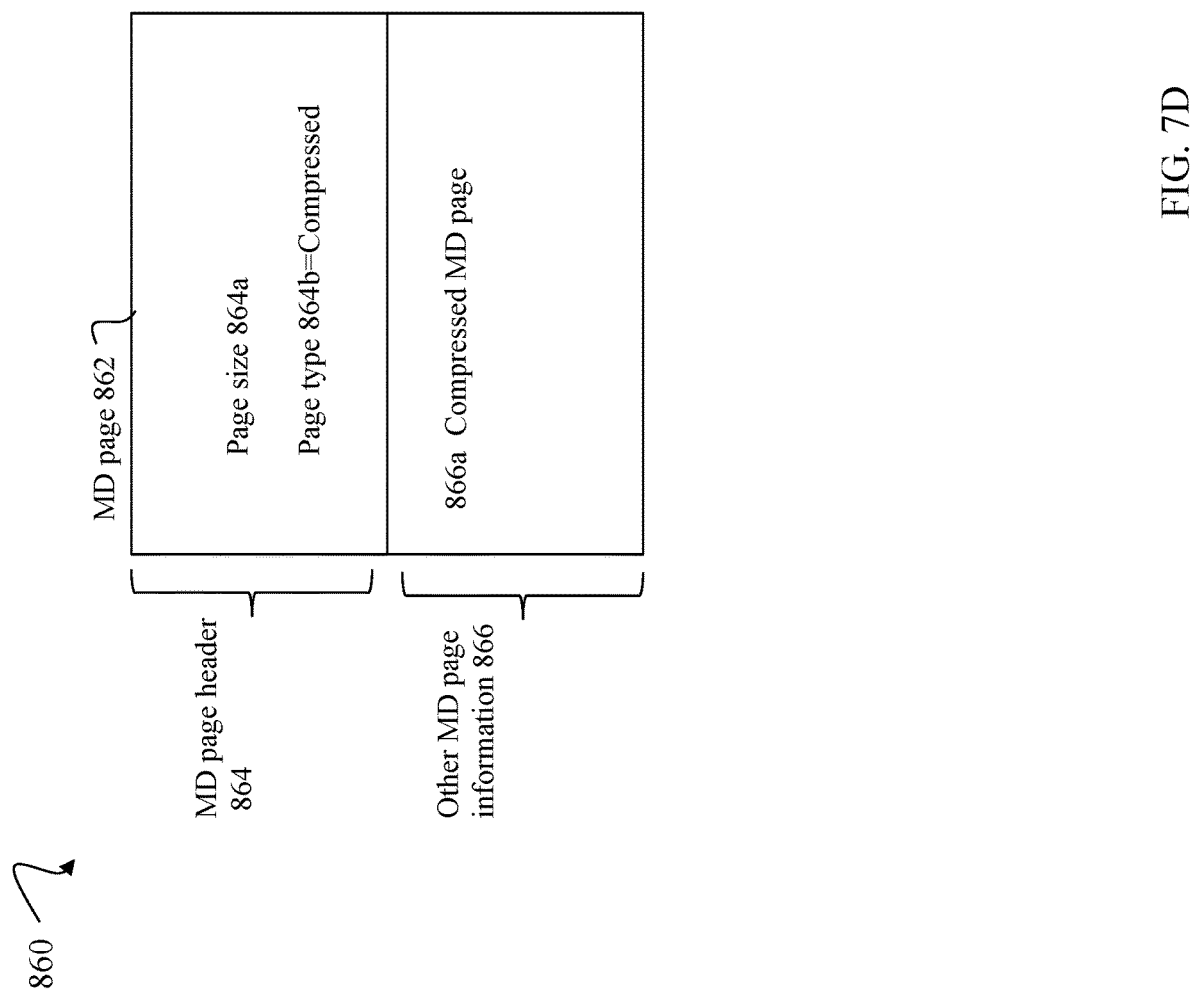

To further illustrate, reference is made to FIG. 7D with an example 860 of a MD page with a page type of Compressed in at least one embodiment in accordance with the techniques of the present disclosure. The MD page 862 includes a MD page header 864 with a page size 864*a* (similar to 822*a* of FIG. 7A) and a page type 864*b* of Compressed. The page type 864*b* of compressed indicates the layout or format of the other MD page information 866 includes 866*a*, the compressed form of the MD page.

In at least one embodiment, processing can be performed to evaluate and select a page size and page type on each MD page update. The processing can select a particular page type based, at least in part, on the actual or expected size of the encoded MD page (encoded with the selected page type), and/or based, at least in part, on the cost of encoding and decoding the MD page in the particular page types. Generally, criteria can be defined which is used in the evaluation to select a particular page type for a particular MD page, such as an updated MD page, to be stored at a physical location on a non-volatile BE PD. The criteria can include the actual or expected size of the encoded MD page (encoded with the selected page type), and/or the cost of encoding and decoding the MD page in the particular page types. The criteria can also include other items besides the foregoing as discussed herein.

In at least one embodiment, the processing can calculate the resulting actual size of the MD page for the various defined page types. In at least one embodiment, processing can calculate the resulting actual size of the MD page for the defined page types Packed and Pairs, and can select to encode the MD page using one of the Packed and Pairs page types depending on which one of these two page types results in the minimum or smaller MD page representation. In at least one embodiment, processing can calculate the resulting actual size of the MD page for the defined page types Compressed, Packed and Pairs, and can select to encode the MD page using one of the Compressed, Packed and Pairs page types depending on which one of these three page types results in the minimum or smaller MD page representation.

In at least one embodiment, compression and decompression can be performed by a dedicated hardware (HW) device, processor, or engine. In at least one embodiment, the data storage system may utilize an x86 instruction set architecture (ISA) for microprocessors from Intel Corporation, and the HW device may be Intel® QuickAssist Technology (Intel® QAT) hardware that includes hardware-based accelerators that perform compression and decompression processing. In such an embodiment, processing can also consider and evaluate the Compressed page type along with the Packed and Pairs page types for a particular MD page. In some embodiments, it can be desirable to consider the Compressed page type for MD page encoding along with the other page types based, at least in part, on the utilization and/or workload of the HW device used to perform compression/decompression. For example, an embodiment can consider compressing a MD page if the current workload or utilization of the HW device (at the time of MD page compression) is less than a threshold. Once a MD page is compressed, additional resources must be used to decode and decompress the MD page in the future when needed. Thus, whether to compress the MD page can be based, at least on part, on current workload or utilization of the HW device as well as future expected workload or utilization such as based on historical usage information. An embodiment can consider compressing a MD page based on historical usage of the HW device indicating that the HW device has an overall or average workload or utilization which is less than a threshold. An embodiment can consider compressing a MD page based on the current HW device utilization or workload and also based on historical usage of the HW device indicating that the HW device has an overall or average workload or utilization which is less than a threshold. Thus, for example, consider a scenario at a first point in time where the HW device that performs compression/decompression currently has a heavy workload and additionally has an overall average utilization which is above a specified threshold. In this case when updating a MD page, processing can be performed which only considers the Packed and Pairs page types but not the Compressed page type. The MD page can have only a few valid entries with valid pointers, such as less than 8 or 10, such that calculations can determine that encoding the MD page with the Pairs page type or format results in the smallest encoded MD page (when considering only the Packed and Pairs page types). As a result, the MD page can be encoded at the first point in time using the Pairs page type.

Continuing with the above example at a subsequent second point in time, the same MD page is updated and processing is again performed to select a Page type for encoding the MD page. At the second point in time, the Packed MD page type can also be omitted from consideration due to the heavy utilization and workload of the HW device. At the second point in time, the MD page can have many more valid entries with valid pointers, such as hundreds of valid entries and pointers, such that calculations can determine that encoding the MD page with the Packed page type or format results in the smallest encoded MD page (when considering the Packed and Pairs page types). Thus, at this second point in time, the MD page can transition from the Pairs to Packed page type and thus be encoded with the Packed page type at the second point in time.

Figure 7E:
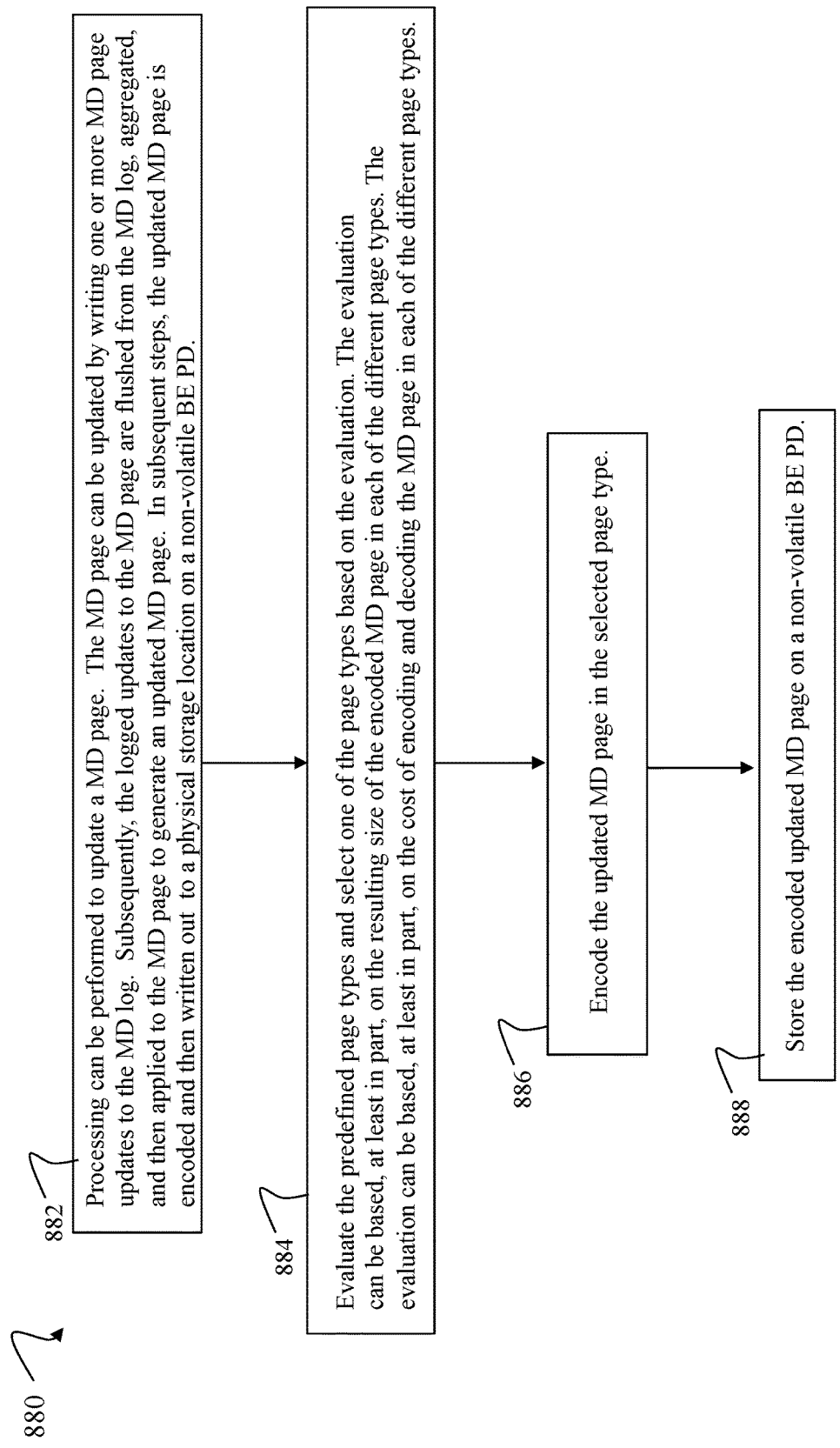
FIGS. 7E and 8 are flowcharts of processing steps that can be performed in at least one embodiment in accordance with the techniques of the present disclosure.

Referring to FIG. 7E, shown is a flowchart 880 of processing steps which can be performed in an embodiment in accordance with the techniques of the present disclosure. The flowchart 880 summarizes processing discussed above when updating a MD page.

At the step 882, processing can be performed to update a MD page. The MD page can be updated by writing one or more MD page updates to the MD log. Subsequently, the logged updates to the MD page are flushed from the MD log, aggregated, and then applied to the MD page to generate an updated MD page. In subsequent steps discussed below, the updated MD page is encoded, based on a selected page type, and then written out to a physical storage location on a non-volatile BE PD. From the step 882, control proceeds to the step 884.

At the step 884, processing can be performed to evaluate the predefined page types for use in encoding the updated MD page, and then select one of the page types based on the evaluation. The evaluation can be based, at least in part, on the resulting size of the encoded MD page in each of the different page types. The evaluation can be based, at least in part, on the cost of encoding and decoding the MD page in each of the different page types. From the step 884, control proceeds to the step 886.

At the step 886, processing can be performed to encode the updated MD page based on the selected page type (selected in the step 884). From the step 886, control proceeds to the step 888.

At the step 888, the encoded updated MD page is written out to a non-volatile BE storage PD.

What will now be described is processing that can be performed in at least one embodiment in connection with read cache miss processing for a MD page. A read request can be made to read the MD page and the MD page is not in cache. In response to the read cache miss, processing discussed below can be performed. As a first step S1, the MD page can be read from the non-volatile BE PDs.

Due to the variable MD page size and its location within the MD page head, the actual size of the MD page to be read is unknown at the time it is being read from the BE PDs. Put another way, the MD page size is located inside the MD page header, so the page size is not known until the MD page has been read from the BE PDs. In at least one embodiment as discussed elsewhere herein, each MD page in its original decoded form can be 4K bytes before encoding. As a result, encoding the MD page based on any of the page types can be generally expected to reduce the size of the MD page, and at the absolute worst case, have the MD page retain its original decoded size of 4K bytes. Thus, 4K bytes can be the maximum known size of any MD page. A first approach to reading the MD page from the BE PDs can include issuing a single read I/O to read the maximum possible size of 4K bytes, and then further decode the MD page to determine the actual MD page size and portion of the 4K bytes read which is actual MD page information. A second alternative approach can include reading a first portion of MD of a specified size or amount of data (e.g., 2K bytes) which is less than the maximum size (e.g., less than 4K bytes). The first portion of MD will include the page size of the MD page header. If the page size indicates that the page size is larger than the specified size or amount of the first portion read (e.g., larger than 2K bytes), then a second read can be issued to read the remaining second portion of the MD page.

In at least one embodiment, processing can select either the foregoing first approach or second approach depending on whether it is desirable to minimize latency or BE bandwidth. If an embodiment wishes to optimize latency over BE bandwidth, the first approach can be used. For example, the first approach can always issue one 4K byte read but can result in reading more data from the BE PDs than needed. Otherwise, if an embodiment wishes to optimize BE bandwidth over latency, the second approach can be used. For example, with the second approach, at least one read is issued and possibly a second read. The second approach more conservatively reads a first smaller amount of data and but can also result in requiring another read for additional data. Thus, the second approach relative to the first approach can result in lower BE bandwidth but can also result in increased latency (than the first approach) due to the possible second read.

Following the step S1 is a step S2 where processing is performed to decode the MD page read from the BE PDs. The step S2 can include examining the MD page header which includes a page type and then performing processing to decode the MD page based on the particular page type.

In the step S2 with reference back to FIG. 7B, if the page type is Packed, processing to decode the MD page can include reading each entry (bit) of the bitmap 826a. If the bitmap entry is 0, the MD page entry or pointer corresponding to the bitmap entry is invalid. If the bitmap entry is 1, the MD page entry or pointer corresponding to the bitmap entry is valid and has a corresponding valid address or pointer included in the array of valid pointers. If the bitmap entry is 1, the next subsequent entry from the array of valid pointers corresponds to the bitmap entry. In particular, a position or count can be maintained regarding the number of valid=1 bits which have been encountered when sequentially consecutively traversing the bitmap 826a where the position or count denotes the corresponding entry in the array of valid pointers 826b which corresponds to a particular bitmap entry. For example, bitmap 826a entry 3=1 and is the first valid bit setting in the bitmap 826a whereby the first entry of the array of valid pointers 826b includes an address or pointer "A" for MD page entry 3. Bitmap entry 10=1 and is the second valid bit setting in the bitmap 826a whereby the second entry of the array of valid pointers 826b includes an address or pointer "B" for MD page entry 10. Bitmap entry 11=1 and is the third valid bit setting in the bitmap 826a whereby the third entry of the array of valid pointers 826b includes an address or pointer "C" for MD page entry 11. In this manner, the MD page can be decoded so that each of the 512 MD page entries includes an invalid pointer (if its corresponding bitmap entry is 0); or otherwise includes a valid pointer or address (if its corresponding bitmap entry is 1), where the valid pointer is obtained from a corresponding entry in the array of valid pointers 826b.

In the step S2 with reference back to FIG. 7C, if the page type is Pairs, the decoded MD page can be initialized with all invalid pointer values in all the MD page entries. Subsequently, each pair can be read from an entry of the array of position/pointer pairs 846a. For each entry including a pair, the first value of the pair can denote the MD page entry or position in the MD page, and the second value of the pair can denote the pointer or address, where the second value of the pair is written to the MD page entry or position denoted by the first value of the pair. For example, the first entry of the array of position/pointer pairs 846a="3A" indicating the MD page entry or position 3 has an address of "A"; the second entry of the array of position/pointer pairs 846a="10B" indicating the MD page entry or position 10 has an address of "B"; and the third entry of the array of position/pointer pairs 846a="11C" indicating the MD page entry or position 11 has an address of "C".

In the step S2 with reference back to FIG. 7D, if the page type is Compressed, the content of the other MD page information 866 is decompressed and the decompressed form can be stored as the content of the decoded MD page.

From the step S2, control proceeds to a step S3, where the decoded MD page can be stored in the cache. In at least one embodiment, each of the cache pages or lines can be the same size as a decoded MD page. In this case, one option is to store the fully decoded MD page in a cache page or line. In at least one embodiment, the fully decoded MD page can be 4K bytes as discussed elsewhere herein.

In at least one embodiment, a page-oriented cache can be maintained and used in connection with MD pages. With a page-oriented cache, the cache can be organized where the key is the LBA or logical address of the MD page, and the value or content stored in the cache is the full corresponding MD page. For example, a cache lookup or query can be performed using the logical address, LBA or other key of a MD page such as a MD leaf page. In response, the cache can return the full corresponding MD page (assuming the MD page is stored in the cache, otherwise a cache miss occurs). With a page-oriented cache, the cached object is the entire MD page with the cache indexed by the LBA or logical addresses of the MD pages.

In at least one embodiment, rather than have a page-oriented cache for storing MD pages, an entry-oriented cache can be used for storing the content (e.g., addresses or pointers) of MD page entries. With an entry-oriented cache, the cache can be organized where the key is a combination of: a MD page LBA or logical address and also an EI or entry index into the MD page. As discussed elsewhere herein EI can denote an entry index corresponding to a particular entry, index, offset or location in the MD page. Thus, with an entry-oriented cache, a cache lookup or query can be performed using the combination of: a MD page LBA or logical address and also an EI or entry index into the MD page. In response, the cache can return the address or pointer (e.g., content) of the particular MD page entry denoted by the combination. With the entry-oriented cache, the content or value of each cache entry can be a single address or pointer stored in a single MD page entry (e.g. cached object is the address or pointer (content) of a single MD page entry). In at least one embodiment using the entry-oriented cache for MD pages, the entry-oriented cache can include only valid pointers or addresses of valid MD page entries. In such an embodiment, all valid pointers or addresses of entries of all MD pages can be stored in the entry-oriented cache. In this manner, querying the entry-oriented cache which results in a cache miss means that the particular MD page entry includes an invalid pointer or address, and otherwise querying the entry-oriented cache which results in a cache hit and returns the address or pointer stored in the particular MD page entry. To further illustrate an entry-oriented cache, consider a first scenario with a first 4K byte MD page of 512 entries which includes only a single valid entry E10 and with 511 remaining invalid entries. In this case, the first MD page includes only a single valid pointer or address A1 stored at entry E10. With an entry-oriented cache, the cache can be updated to store only a single cache line or entry for the single valid entry E10. Assume that the first MD page has an associated LBA or logical address LA1. The entry-oriented cache can store the address or pointer A1 (as the cached content) indexed by the combination of LA1, E101 as the key. To further illustrate an entry-oriented cache, consider a second scenario with a second 4K byte MD page of 512 entries which includes 512 valid entries E1-E512 and no invalid entries. In this case, the second MD page includes only valid pointers or addresses A1-A512, stored respectively, at valid entries E1-E512, and includes no invalid pointers or address. With an entry-oriented cache, the cache can be updated to store all 512 valid pointers or addresses for the valid 512 MD page entries. Assume that the second MD page has an associated LBA or logical address LA1. The entry-oriented cache can store the 512 addresses or pointers A1-A512 (as the cached content) indexed, respectively, by 512 combination keys. Each of the combination keys can include LA2 and a corresponding one of the 512 MD page indices or entries E1-E512. It should be noted that the particular valid pointers or addresses added to the cache when a MD page is read from its non-volatile BE PD storage location in connection with servicing a read cache miss can vary in accordance with a defined caching policy. The foregoing examples with an entry-based cache denote a caching policy where all such valid pointers or addresses of a MD page are added to the cache. In contrast, an embodiment can implement other caching policy variations. For example, the read which caused the read cache miss may have been a request to read content of a particular MD page entry E15 of the MD page. Once the MD page is read from the BE PDs, the caching policy in at least one embodiment can choose to only add the particular address or pointer for the MD page entry E15 to the entry-based cache rather than automatically add all valid addresses or pointers of the MD page to the entry-based cache. Thus, use of an entry-based cache can be more space efficient than a page-based cache particularly in instances where the MD pages cached are sparsely populated with valid entries and valid addresses or pointers.

As yet another variation, both a page-oriented cache and an entry-oriented cache in at least one embodiment in accordance with the techniques of the present disclosure. In one such embodiment, the page-oriented cache can be used to cache MD pages which are generally highly populated with valid pointers and valid entries, such as above a specified threshold amount or percentage. For example, a caching policy can indicate to store a MD page in the page-oriented cache is the MD page has 50% or more of valid entries or valid pointers, and otherwise, select to store only valid pointers of valid entries of the MD page in the entry-oriented cache. In such an embodiment, processing performed to determine whether a particular MD page entry is in cache can generally query both the MD page cache and the entry-oriented cache. The particular order in which the look-up or query is performed with respect to the page-oriented cache and the entry-oriented cache can vary with embodiment. For example, in at least one embodiment, when determining whether a particular MD page entry has its contents stored in cache, processing can first query the entry-based cache, and if not found, then query the page-oriented cache. As a variation, an embodiment can use any suitable heuristic in connection with determining the order in which the foregoing two caches are queried for a particular MD page entry.

Figure 8:
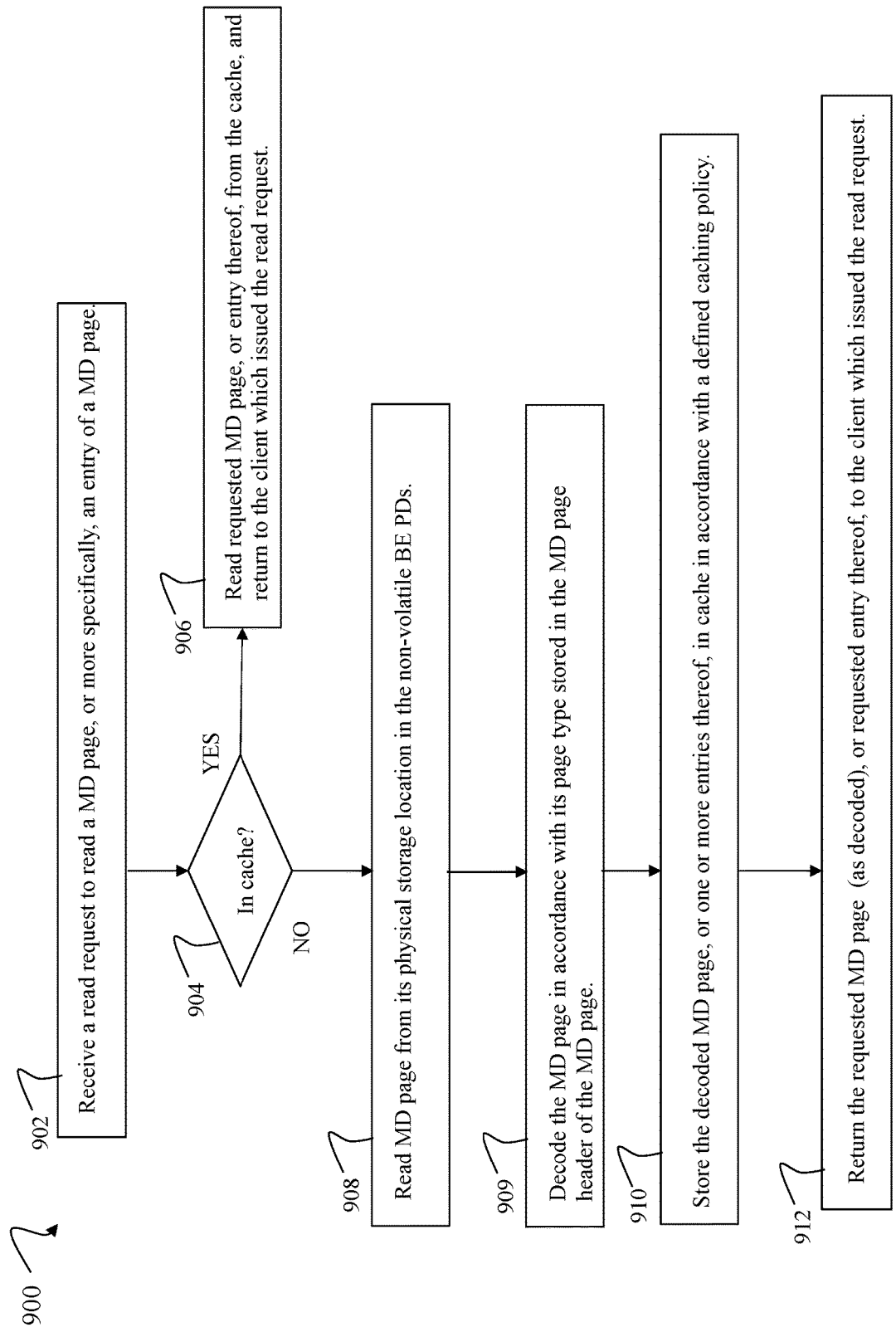

Referring to FIG. 8, shown is a flowchart 900 of processing steps that can be performed in at least one embodiment in accordance with the techniques of the present disclosure. The flowchart 900 processing can be performed in connection with servicing a read request for metadata in at least one embodiment in accordance with the techniques of the present disclosure. The steps of the flowchart 900 summarize processing discussed above.

At the step 902, a read request can be received to read a MD page, or more specifically, an entry of a MD page. From the step 902, control proceeds to the step 904.

At the step 904, a determination is made as to whether the requested metadata is in cache. If the step 904 evaluates to yes, control proceeds to the step 906. At the step 906, the requested metadata can be retrieved from the cache and then returned to the client which initiated the read requested. Consistent with discussion above, metadata can be cached in a page-oriented cache and/or an entry-oriented cache. The cache queried in the step 804 can include the page-oriented cache and/or the entry-oriented cache depending on what one or more caches are used to cache metadata in an embodiment.

If the step 904 evaluates to no, control proceeds to the step 908. At the step 908, the MD page is read from its physical storage location in the non-volatile BE PDs. From the step 908, control proceeds to the step 909.

At the step 909, processing is performed to decode the MD page in accordance with its page type stored in the MD page header of the MD page. Consistent with discussion above, the steps 908 and 909 can be performed in some embodiments in a combined manner, for example, if the second approach to reading the MD page from the BE PD is utilized (e.g., as in the step S1 and S2 discussed above). From the step 909, control proceeds to the step 910.

At the step 910, the decoded MD page, or one or more entries thereof, can be stored in cache in accordance with a defined caching policy. From the step 910, control proceeds to the step 912.

At the step 912, processing can be performed to return the requested MD page (as decoded), or requested entry thereof, to the client which issued the read request.

Thus, the techniques of the present disclosure using variable size MD pages can be used to improve usage efficiency with respect to non-volatile storage of the BE PDs used to store metadata. As an example in at least one embodiment in accordance the techniques of the present disclosure where only 50% of the UD logical addresses are populated or valid and the remaining 50% are not populated or invalid, the related non-volatile storage used for storing the MD pages is also almost 50%.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
generating an updated first metadata (MD) page by performing one or more updates to an existing version of the first MD page;
selecting a first page type to be used for encoding the updated first MD page, wherein said selecting selects the first page type from a plurality of predefined page types, wherein each of the plurality of predefined page types identifies a different metadata layout or format for storing MD pages;
encoding the updated first MD page in accordance with the first page type and accordingly generating a first encoded version of the updated first MD page; and
storing the first encoded version of the updated first MD page at a first physical storage location of a non-volatile storage device.

2. The computer-implemented method of claim 1, wherein the first page type selected by said selecting is based, at least in part, on a first actual or expected size of the first encoded version of the updated first MD page when encoded with the first page type relative to one or more other actual or expected sizes of other encoded versions of the updated first MD page when encoded with one or more others of the plurality of predefined page types.

3. The computer-implemented method of claim 2, wherein the first actual or expected size of the first encoded version of the updated first MD page is a minimum size with respect to the first actual or expected size and the one or more other actual or expected sizes of other encoded versions of the updated first MD page.

4. The computer-implemented method of claim 1, wherein the first page type selected by said selecting is based, at least in part, on costs of encoding and decoding the updated first MD page in accordance with the plurality of predefined page types.

5. The computer-implemented method of claim 1, wherein the first MD page is one of a plurality of MD pages stored at a plurality of physical storage locations on non-volatile storage devices, wherein the plurality of MD pages are stored at the plurality of physical storage locations in a plurality of encoded formats or layouts based on a particular one of the plurality of predefined page types selected for each of the plurality of MD pages.

6. The computer-implemented method of claim 5, wherein sizes, of the plurality of MD pages as stored in their respective encoded formats or layouts, vary.

7. The computer-implemented method of claim 5, wherein each of the plurality of MD pages includes a plurality of entries.

8. The computer-implemented method of claim 7, wherein the plurality of predefined page types includes a packed page type having an associated format or layout including a bitmap and an array of valid pointers or addresses, wherein the bitmap identifies which entries of a MD page include valid pointers or addresses and which entries of a MD page include invalid pointers or addresses, and wherein the array only includes pointers or addresses for corresponding MD page entries which are identified as valid by the bitmap.

9. The computer-implemented method of claim 7, wherein the plurality of predefined page types includes a pairs page type having an associated format or layout including an array of paired values, wherein each entry of the array includes a pair of values, wherein a first value of the pair identifies a MD page position or entry including a valid address or pointer, and wherein a second value of the pair identifies an address or pointer stored at the MD page position or entry as denoted by the first value of the pair.

10. The computer-implemented method of claim 9, wherein the array only includes array entries for corresponding MD page positions or entries with valid addresses or pointers.

11. The computer-implemented method of claim 7, wherein the plurality of predefined page types includes a compressed page type having an associated format or layout including a compressed version of a MD page.

12. The computer-implemented method of claim 1, wherein the first encoded version of the updated first MD page includes a first page header comprising a first page size field and a first page type field, wherein the first page size field specifies a size of the first encoded version of the updated first MD page, and wherein the first page type field identifies the first page type selected by said selecting.

13. The computer-implemented method of claim 12, wherein a plurality of encoded versions of a plurality of MD pages are stored at a plurality of physical storage locations on one or more non-volatile storage devices, wherein each of the plurality of encoded versions for a corresponding one of the plurality of MD pages includes a corresponding page header comprising a page size field and a page type field, wherein the page size field specifies a size of said each encoded version of the corresponding MD page, and wherein the page type field identifies one of the plurality of predefined page types corresponding to said each encoded version of the corresponding MD page.

14. The computer-implemented method of claim 13, wherein the first page header and the corresponding page headers of the plurality of encoded versions of the plurality of MD pages are a same size.

15. The computer-implemented method of claim 12, further comprising:
receiving a read request for a first entry of the first MD page;
determining that data requested by the read request is not in cache thereby generating a read cache miss; and
responsive to the read cache miss, performing first processing including:
reading the first encoded version of the updated first MD page from the first physical storage location;
decoding, in accordance with the first page type of the first page header, the first encoded version of the updated first MD page;
generating, in accordance with said decoding, a decoded version of the first MD page;
storing the decoded version of the first MD page, or one or more entries thereof, in cache; and
in response to the read request, returning a first address or pointer stored at the first entry of the decoded version of the first MD page.

16. The computer-implemented method of claim 1, further comprising:
storing the one or more updates to the existing version of the first MD page in a MD log;
flushing the one or more updates from the MD log; and
responsive to said flushing, performing said generating that generates the updated first MD page.

17. The computer-implemented method of claim 16, wherein the existing version of the first MD page is stored at a second physical storage location on a non-volatile storage device, and wherein the first physical storage location is different from the second physical storage location.

18. A system comprising:
one or more processors; and
a memory comprising code stored thereon that, when executed, performs a method comprising:
generating an updated first metadata (MD) page by performing one or more updates to an existing version of the first MD page;
selecting a first page type to be used for encoding the updated first MD page, wherein said selecting selects the first page type from a plurality of predefined page types, wherein each of the plurality of predefined page types identifies a different metadata layout or format for storing MD pages;
encoding the updated first MD page in accordance with the first page type and accordingly generating a first encoded version of the updated first MD page; and
storing the first encoded version of the updated first MD page at a first physical storage location of a non-volatile storage device.

19. A non-transitory computer readable medium comprising code stored thereon that, when executed, performs a method comprising:
generating an updated first metadata (MD) page by performing one or more updates to an existing version of the first MD page;
selecting a first page type to be used for encoding the updated first MD page, wherein said selecting selects the first page type from a plurality of predefined page types, wherein each of the plurality of predefined page types identifies a different metadata layout or format for storing MD pages;

encoding the updated first MD page in accordance with the first page type and accordingly generating a first encoded version of the updated first MD page; and storing the first encoded version of the updated first MD page at a first physical storage location of a non-volatile storage device.

\* \* \* \* \*